(12) United States Patent
Kienholz

(10) Patent No.: US 6,196,514 B1
(45) Date of Patent: Mar. 6, 2001

(54) LARGE AIRBORNE STABILIZATION/VIBRATION ISOLATION SYSTEM

(75) Inventor: David A. Kienholz, Palo Alto, CA (US)

(73) Assignee: CSA Engineering, Inc., Palo Alto, CA (US)

( * ) Notice: Subject to any disclaimer, the term of this patent is extended or adjusted under 35 U.S.C. 154(b) by 0 days.

(21) Appl. No.: 09/157,142

(22) Filed: Sep. 18, 1998

(51) Int. Cl.⁷ ..................................................... F16M 13/00
(52) U.S. Cl. .......................... 248/550; 244/164; 248/636; 248/638; 267/136
(58) Field of Search ..................................... 248/638, 550, 248/636; 244/164, 170, 171, 17.27, 3.23, 3.16; 267/136

(56) References Cited

U.S. PATENT DOCUMENTS

| | | | |
|---|---|---|---|
| 3,469,809 | * 9/1969 | Reznick et al. | 248/562 |
| 3,514,054 | * 5/1970 | Mard et al. | 244/17.27 |
| 4,101,102 | * 7/1978 | Lloyd | 248/636 |
| 4,315,610 | * 2/1982 | Malueg | 244/3.16 |
| 4,405,101 | * 9/1983 | Carlson et al. | 244/17.27 |
| 4,796,873 | * 1/1989 | Schubert | 248/550 X |
| 5,000,415 | * 3/1991 | Sandercock | 248/550 |
| 6,000,661 | * 12/1999 | Price et al. | 244/164 |
| 6,022,005 | * 2/2000 | Gran et al. | 267/136 |

* cited by examiner

Primary Examiner—Ramon O. Ramirez
Assistant Examiner—Tan Le
(74) Attorney, Agent, or Firm—James Creighton Wray; Meera P. Narasimhan

(57) ABSTRACT

The present invention provides a vibration isolation system. The Airborne Stabilization/Vibration Isolation System (AS/VIS) is a combination of advanced pneumatic passive suspension, high-capacity voice-coil actuators, integrated sensors, a control processor and a commercial system of software development tools. The entire vertical weight load is borne by the pneumatic mounts. Vertical payload motion is accommodated with little or no friction through the use of air bearings at all sliding surfaces of the mounts. The high-force voice-coil actuators provide a variety of performance enhancements to the passive isolation system. Primarily, they allow control of the payload mean position in the presence of low-frequency quasistatic load variations due to aircraft maneuvering. Horizontal and vertical displacement sensors detect the position of each actuator moving element relative to ground. The controller sends a signal to power amplifiers, which drive the horizontal and vertical voice-coil actuators. The active system can add damping, add or subtract stiffness, and can reduce isolator stroke requirements by feeding forward the low frequency portion of base acceleration.

50 Claims, 28 Drawing Sheets

| | Linear spring | Air spring | |
|---|---|---|---|
| Model | W, k | weight W, 3, 5, 9, pressure p, area A, 13, Volume V, 15 | W, pA |
| Deflection under payload weight | $W/k = \dfrac{g}{\omega_s^2}$ | adjustable to zero | |
| Corner frequency $\omega_s$, rad/sec | $\sqrt{kg/W}$ | $\sqrt{\dfrac{\gamma gA}{V}} \sqrt{1 + \dfrac{Ap_{atm}}{W}}$  $\gamma$ = air constant | |

Grade 35 magnets
3060 amp-turn coil
Axial force, lbs
Coil displacement from center, inches

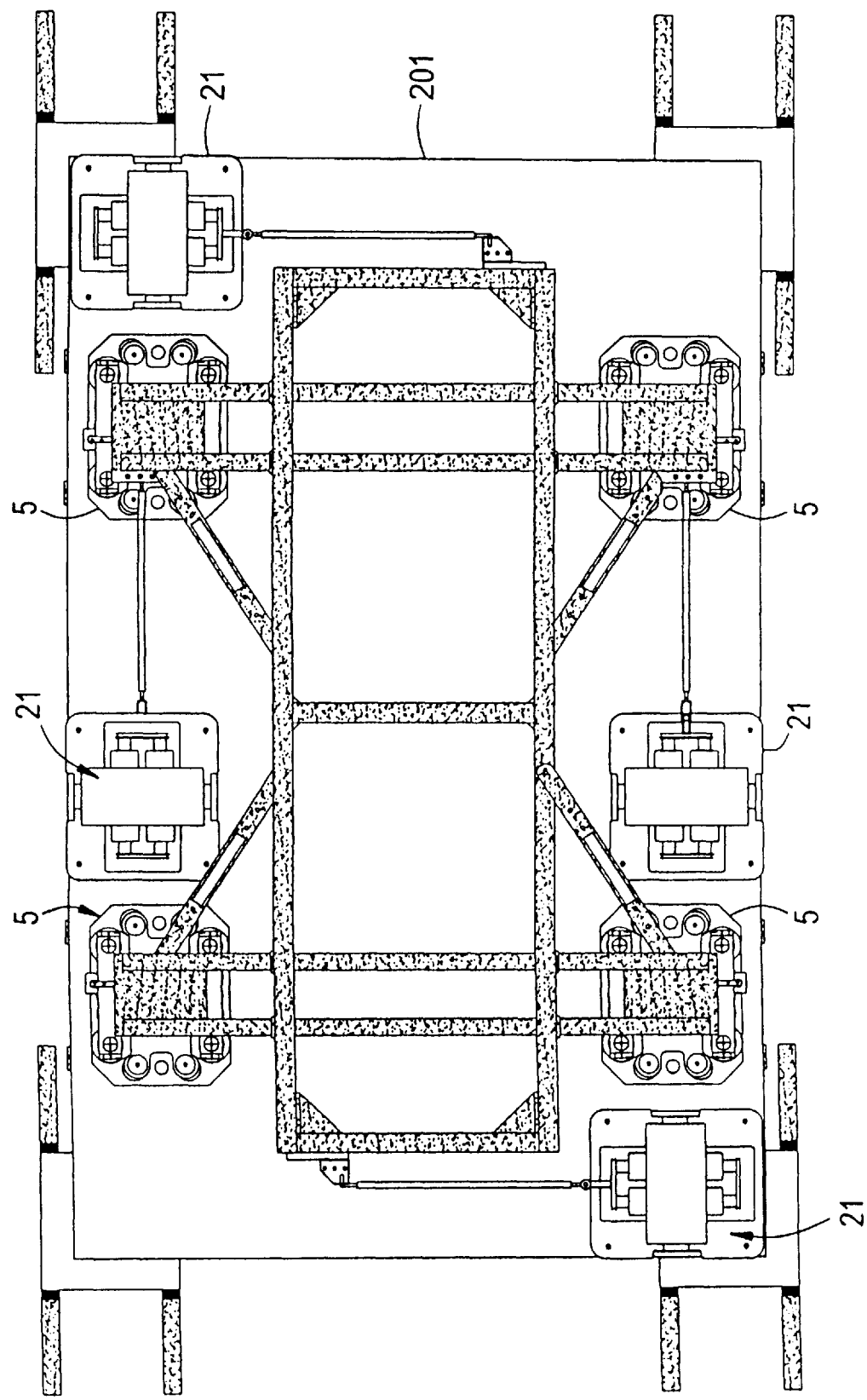

Transmissibility

Input and output acceleration spectra

Input and output acceleration spectra

Transmissibility

FIG. 28
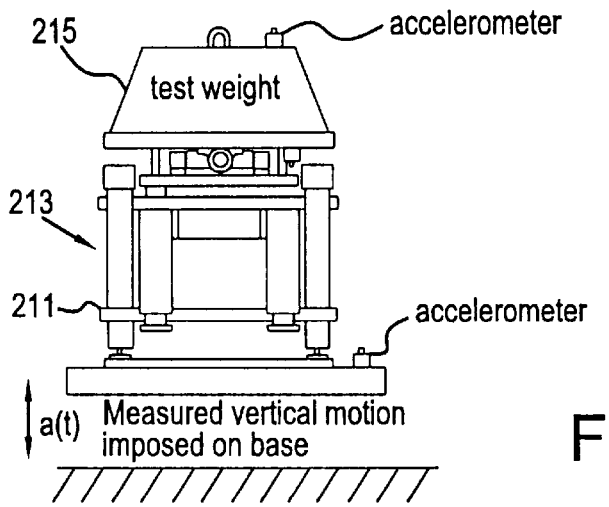
FIG. 29
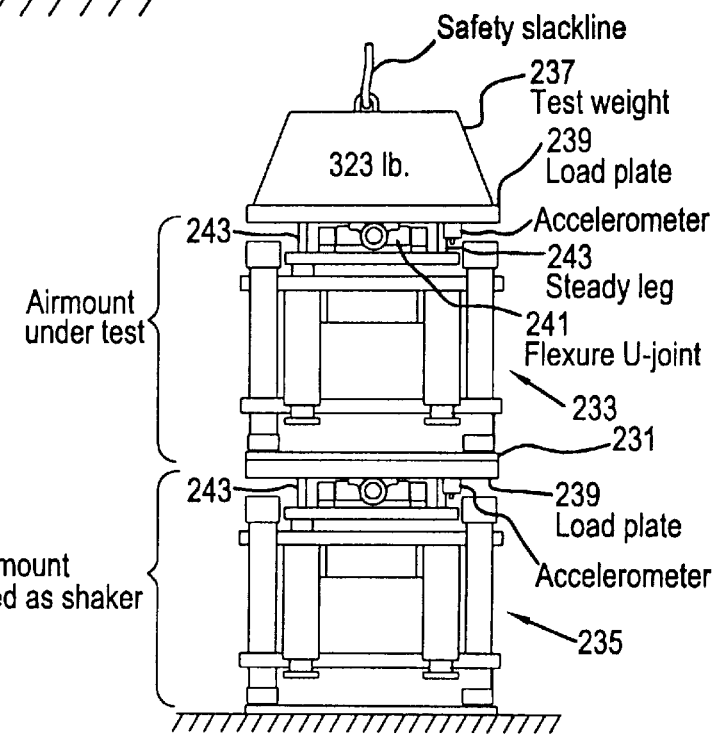
FIG. 30
| Tank size | 2 gal. | | 7 gal. | | 30 gal. | |
|---|---|---|---|---|---|---|
| Payload, lb. | 323 | 165 | 323 | 165 | 323 | 165 |
| Active gain lbf/inch | 24.3 | 4.86 | 10.8 | 4.86 | 6.08 | 4.86 |
| | | 24.3 | | | | |

All curves:
 payload = 195 lbs
 piston area = 12.56 in^2
 active stiffness = 4.86 lbf/inch Spectra of base accel and payload accel, test 6

| Test number | 5 | 6 | 7 |
|---|---|---|---|
| Tank size, gal. | 30 | 7 | 2 |
| Total volume, cu. in. | 7002. | 1696. | 542. |
| Piston area, sq. in. | 12.56 | 12.56 | 12.56 |
| Total piston load, lbs* | 225. | 225. | 225. |
| Active stiffness, lbf/inch | 4.86 | 4.86 | 4.86 |
| Calculated freq., Hz. | 0.93 | 0.66 | 0.54 |
| Measured freq., Hz. | 0.90 | 0.70 | 0.57 |

* Includes carriage, load plate, and test weight

LARGE AIRBORNE STABILIZATION/VIBRATION ISOLATION SYSTEM

This invention was made with Government support under F29601-93-C-0203 awarded by the Department of the Air Force. The Government has certain rights in this invention.

BACKGROUND OF THE INVENTION

Prior systems exist that are intended for active isolation and vibration suppression. Those systems use a combination of passive pneumatics for isolation and magnetic actuators for vibration suppression. However, those systems are limited in three ways. First, they are intended only for dealing with low-level ambient background vibration, such as what is encountered in a laboratory or in a clean room. Second, they are incapable of tolerating near-zero-frequency acceleration, such as is encountered in an aircraft in flight or in a moving vehicle. Third, existing isolation systems using pneumatic springs, whether actively augmented or not, are limited to suspension frequencies no lower than about 2 Hz. That limits the amount of isolation possible, particularly in the important frequency range between 5 and 50 Hz. The present invention has no such limit and readily produces suspension frequencies in the range of 0.1 to 1.0 Hz. Those differences in application lead to major differences in operating principles and in construction of the system. Needs exist for a high level of isolation from large inputs. The system also needs to be able to provide that isolation in the presence of a constant or slowly varying acceleration. Specifically, the system needs to be able to perform in an aircraft in flight or a sea or land vehicle in motion.

SUMMARY OF THE INVENTION

The invention relates to vibration reduction in general, and vibration isolation and active stabilization in particular. The invention is intended for optical or electro-optical systems where components, such as large mirrors, must be held in accurate registration to each other, or for beam-generating devices that are under the influence of externally generated vibration.

This invention provides a vibration isolation system particularly for use with airborne optical systems. A unique passive-active vibration isolation system suspends sensitive airborne payloads such as optical benches. The system, called the Airborne Stabilization/Vibration Isolation System (AS/VIS), is useful for the special requirements of the Airborne Laser (ABL). Other uses are contemplated.

AS/VIS is the most capable isolation system possible, even if it exceeded actual requirements.

These and further and other claims and features of the invention are apparent in the disclosure, which includes the above and ongoing written specification, with the claims and the drawings.

BRIEF DESCRIPTION OF THE DRAWINGS

FIGS. 23A and 23B are top and side views of an AS/VIS system test apparatus.

FIG. 28 is a front elevation of a direct method of testing isolator transmissibility.

FIG. 29 is a front elevation of apparatus for conducting a direct transmissibility test.

FIG. 30 is matrix of seven combinations of payload, accumulator tank size and active displacement loop gain.

DETAILED DESCRIPTION OF THE PREFERRED EMBODIMENTS

Isolation for Airborne Laser Optical Benches

The vibration isolation problem for ABL has a number of special characteristics. Their effects on the design of AS/VIS will be apparent.

Figures 1, 4:
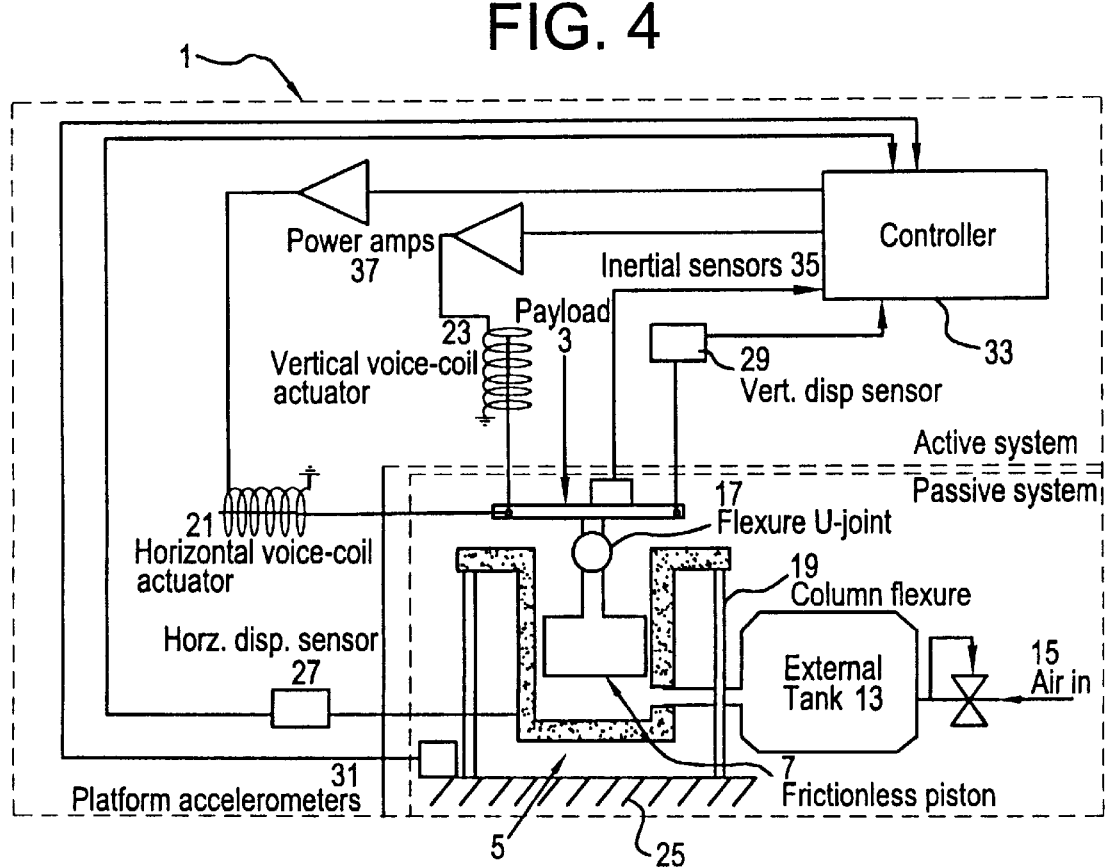
FIG. 1 is a chart comparing linear spring and air spring vibration mounts.
FIG. 4 is a schematic block diagram of the AS/VIS.

The level of isolation required is fairly high, on the order of typical passive laboratory systems currently in use, for example with research optical benches or electron microscopes. That implies a passive break frequency of a few Hz at most. Completely passive isolators such as metal springs or elastomeric "biscuits" are inadequate, being limited by static sag to break frequencies no lower than about 5 Hz. That basic contradiction in requirements, low stiffness for isolation versus high stiffness to limit static deflection, may be resolved through the use of pneumatic mounts, or "airmounts" 5. They have the very useful property of being globally nonlinear but locally linear. That is, their small-displacement tangent stiffness, which controls isolation, is decoupled from global stiffness that determines static sag, such as caused by payload 3 weight. FIG. 1 illustrates this for the case of an ideal air spring 5 where only the air contributes to stiffness.

Conventional airmounts are limited to minimum break frequencies of about 2 Hz. The bottom limit is set by the parasitic stiffness of the reinforced elastomeric bag or diaphragm 13 used to contain the air. An important feature of the new AS/VIS system is that it overcomes this barrier and has no minimum break frequency.

The choice of break frequency is quite important. Unlike the laboratory environment where soft isolators are most often used, a 747 airplane is a large, flexible structure with numerous vibration modes below 10 Hz. A wing-bending mode, for example, may easily put a large excitation component close to the isolation suspension frequencies. In this situation, a conventional isolator may actually make payload vibration worse. Such low frequency excitation must be handled either by (1) getting the passive break frequency very low, under the excitation frequency, or (2) actively stiffening the mount at low frequency while allowing faster than second-order roll-off to regain isolation at higher frequency, or (3) actively stabilizing the payload by using payload-mounted inertial sensors in feedback loops to tie it to inertial ground. The present invention, AS/VIS, is capable of implementing any of those strategies.

As usual in isolation problems, the high isolation provided by a low break frequency (soft mounts) brings with it an important limitation. Slowly varying loads produce significant displacement of the payload. In the ABL case, such quasistatic loading will occur due to aircraft maneuvering. Local-vertical acceleration, normal to the aircraft floor, may exceed 0.2 g. With a 1.0-Hz suspension frequency, this translates to displacement of 1.95 inch, FIG. 1. That may be unacceptable if the payload contains optics that are held in registration to some off-bench datum.

Similarly, it is highly likely that several payloads or benches will be used inside the ABL airplane, with various optical beams passing among them. That implies that at least the mean positions of the payloads must be held in registration to each other while individually they are still isolated from air frame vibrations. The need for soft suspension coupled with active mean-position control is clear.

Several aspects of the ABL isolation problem point to the need for an active system, or at least an active subsystem augmenting passive isolators. However, most active isolators to date have been based on piezoelectric or magnetostrictive actuators. Those are immediately ruled out for ABL because the spectrum of floor acceleration dictates much more stroke than can be provided by electrically induced material deformation.

The latter are usually limited to, at most, a few thousandths of an inch of motion. Viable ABL isolators require over an inch of stroke in each direction.

Figure 2A:
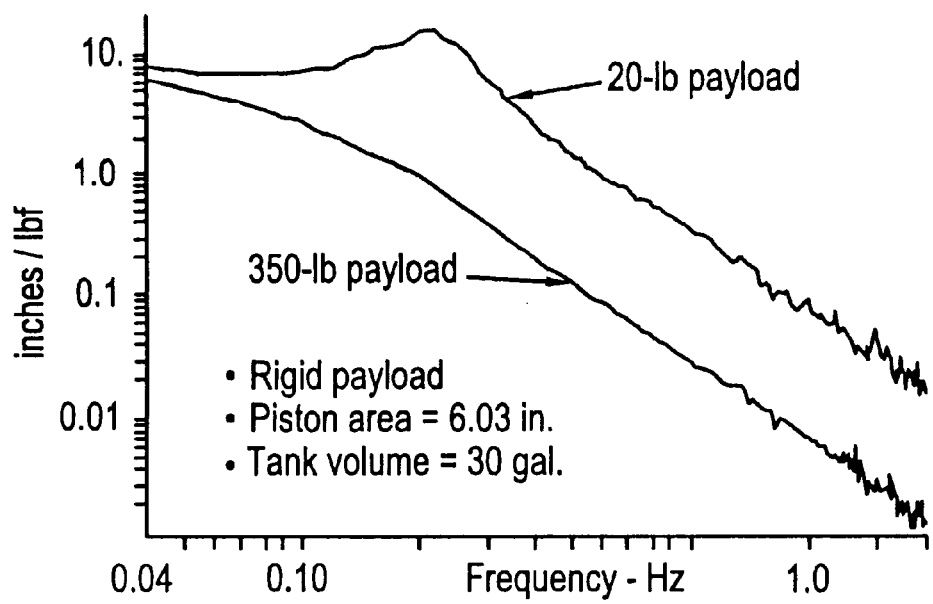
FIGS. 2A and 2B are graphs of vertical frequency response and vertical friction test results, respectively, for a pneumatic-magnetic suspension device.
Figure 2B:
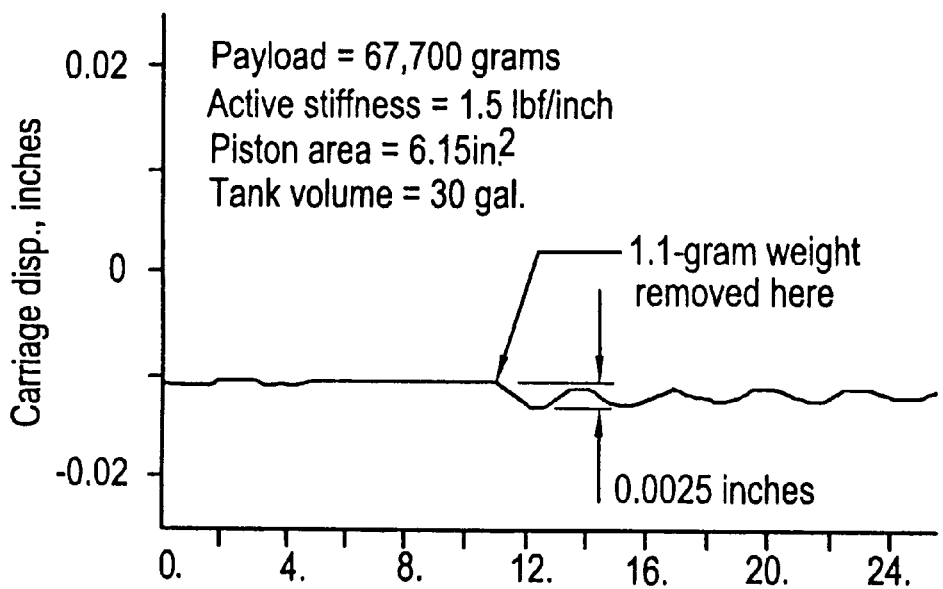

AS/VIS was not created entirely for the ABL. Important elements are derived from CSA Engineering work on passive-active suspension systems for simulating zero gravity. In particular, the very-low-frequency pneumatic mounts are based on hardware developed earlier. FIGS. 2A and 2B show test data on a CSA suspension device. That proven capability for providing very soft, frictionless suspension was a primary motivation for the technical direction of the present invention.

The extensions required for AS/VIS concerned drastically increasing the active force capability, reducing the size and weight of the devices, providing integrated horizontal compliance and actuation, and developing control strategies for airborne use.

Figure 3:
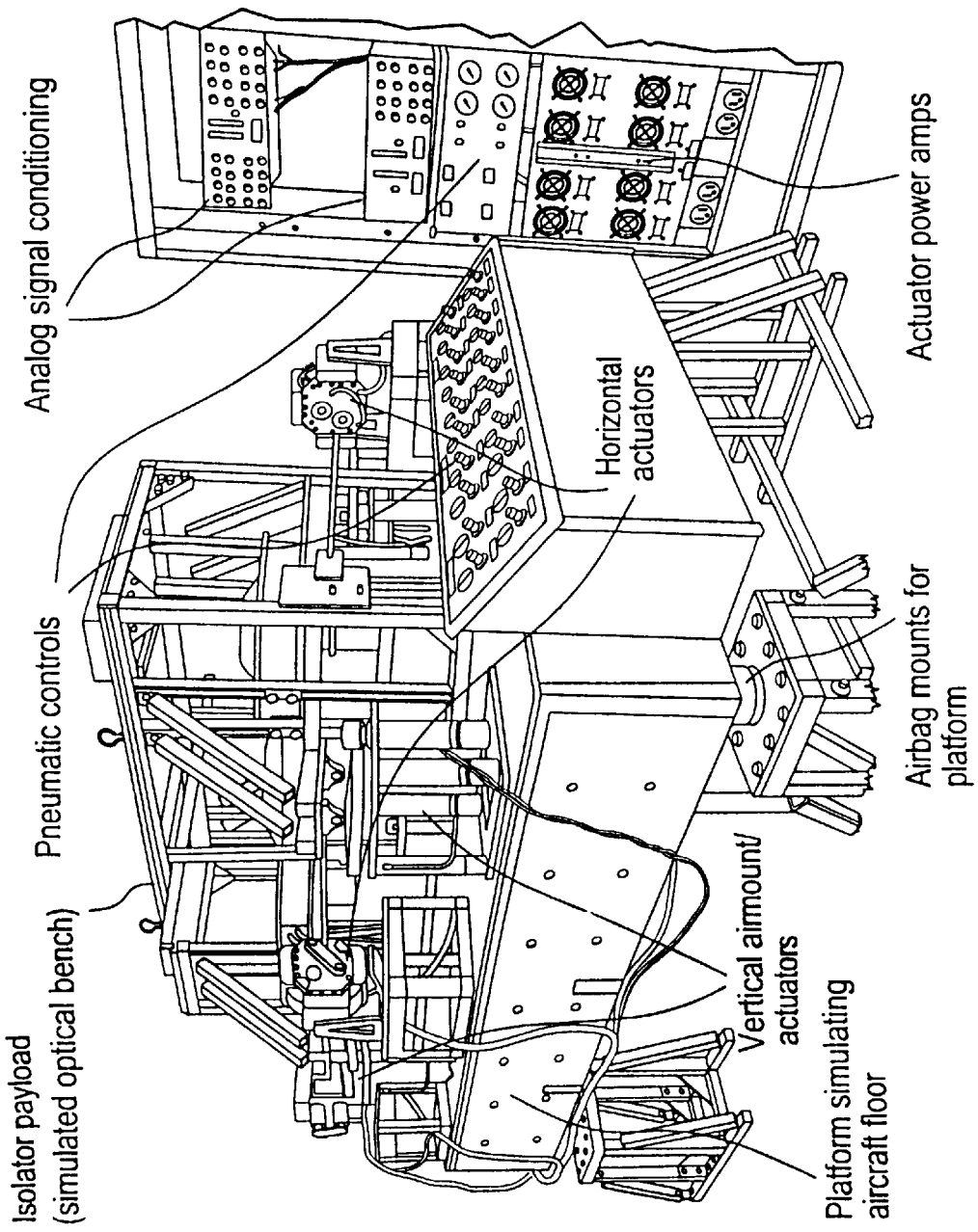
FIG. 3 is a perspective view of an AS/VIS testbed.

FIG. 3 shows the AS/VIS system set up for vertical transmissibility testing. Summary descriptions of the various elements and their importance within the system are given below.

The system 1 includes four passive-active isolation mounts 5, called airmount/actuators, which may jointly support payloads in excess of 3000 lbs. The entire vertical weight load is borne by a proprietary type of pneumatic mount with a second-order break frequency of 1.1 Hz. The pneumatic elements, essentially passive devices, may readily be changed without internal modifications to produce an arbitrarily low break frequency.

The airmounts use no elastomeric or other flexing elements to contain the compressed air. That allows them to circumvent the previous lower limit on break frequency. Vertical payload motion is accommodated with little or no friction through the use of air bearings at all sliding surfaces of the mounts.

The pneumatic mounts are used in series with an integrated passive flexure mechanism to allow horizontal suspension frequencies in the neighborhood of 0.75–2.00 Hz. A value of 1.26 Hz was demonstrated with a test payload of 1400 lb on four mounts. The flexures are essentially linear springs with highly predictable behavior.

The vertical mounts contain custom-designed integrated voice-coil actuators. Each may produce a force of about 220 lbs for about 10 seconds and about 180 lbs sustained. Four similar voice-coil actuators, separate from the vertical mounts, act on the payload, two in each horizontal direction. The actuators have a bandwidth in excess of 40 Hz. Thrust to weight ratio is in excess of 2.4:1, well above any commercial device having comparable stroke (1.25 inches vertical, 1.00 inches horizontal). Horizontal actuators also use air bearings to eliminate friction and stiffness between the moving element and the device frame. Horizontal and vertical actuators both include integral displacement sensors.

The high-force voice-coil actuators provide a variety of performance enhancements to the passive isolation system.

Primarily, they allow control of the payload mean position in the presence of low-frequency quasistatic load variations due to aircraft maneuvering. They may also be used to slave the mean position of one bench relative to another, or multiple benches relative to some master reference. Using acceleration feedforward, they can offset such inertial loads without adding stiffness which would degrade isolation performance. They may be used with payload-mounted inertial sensors to actively stabilize the platforms in inertial space. The actuators may provide adaptive, on-the-fly stiffening of the system, either linear or nonlinear, for operation in turbulent flying conditions. They may provide active damping of suspension modes without degrading isolation at higher frequencies, as do passive dampers. They may allow active suppression of low-order vibration modes of the optical benches. Such modes are usually the most damaging to laser performance.

AS/VIS includes a real-time VMEbus control computer, 32-channel A/D and 8-channel D/A electronics, software development and operating system, and development host computer.

AS/VIS includes electronics for sensor signal conditioning and for driving the voice-coil actuators. The system includes 16 channels of DC-coupled accelerometer sensing with a bandwidth in excess of 340 Hz. Noise floor and sensitivity of the channels accommodate the range from the largest input (floor vibration) to below the projected level on the isolated payload for moderate inputs. The DC-coupled acceleration sensing is also suitable for use with an acceleration feedforward control scheme.

Integrated signal conditioning is provided for eight displacement sensors, four each in the vertical and horizontal actuators. Resolution is about 0.0005 inches and bandwidth is over 200 Hz. Displacement signals are available both for diagnostic testing and for use in the control algorithm. Modular, current-drive linear power amplifiers and DC supplies are included, sized to drive the actuators to their thermal limits.

Integrated preamplifiers are provided to match the D/A outputs to the power amplifier inputs. Patch paneling is provided to allow simple control laws to be implemented in analog for demonstration or diagnostic purposes.

The AS/VIS hardware (vertical airmount/actuators and horizontal actuators) has been integrated into a system. It allows simulation in hardware of vibration of an aircraft floor. It includes a simulated optical bench as a payload whose weight may be varied from 400 to about 2500 pounds. The acceleration sensors described earlier are mounted on the vibrating platform and the payload.

Passive, vertical-direction isolation in the 2–20 Hz range is essentially as predicted. Break frequency is 1.1 Hz with active stiffness set to its nominal value and 0.66 Hz with active stiffness off. Transmissibility crosses 0 dB at about 1.6 Hz and reaches −40 dB at 10 Hz. That performance is confirmed by component-level tests of single airmounts. Measurement of transmissibility at higher frequency is limited by payload dynamics and by acoustic shunt-path excitation around the isolators, just as it is in actual ABL hardware.

Concept and Operating Principle

The basic idea behind AS/VIS is quite simple. It consists of two essential elements. The payload (optical bench) is "floated" with respect to the aircraft floor using very soft pneumatic mounts derived from CSA zero-G suspension devices. Those may give a passive break frequency low enough to get under all important peaks in the floor vibration spectrum. Being virtually frictionless, they operate linearly over a wide range of input levels. They give passive isolation substantially better than current-generation laboratory systems. Unlike current piezo-based active systems, they accommodate over an inch of stroke, enough to be suitable for use in the relatively high-vibration airborne environment. However, their extremely low stiffness leaves the payload vulnerable to large static displacements caused by changes in static loading such as due to aircraft maneuvering.

The payload is then coupled to ground by high-force voice coil actuators in all six degrees of freedom. The actuators are used to offset quasistatic force changes that would otherwise cause large rigid-body displacements of the payload on the soft mounts. In a sense, the actuators allow the active control system to "fly" the payload such that its mean position is slaved to that of the aircraft but the two are decoupled with respect to flexing motions of either. In straight, level flight, the active system may be used with payload-mounted inertial instruments to stabilize the payload in inertial space.

FIG. 4 illustrates the AS/VIS 1 operating concept. Three or more hard points on the payload 3 are supported by airmount/actuators 5. Each spring is composed of a piston 7 in a closely fitted cylinder 9 connected by a large-diameter line 11 to an external volume 13. From FIG. 1, the dynamic stiffness (i.e., the suspension frequency) is made very low by choice of the piston 7 area and tank 13 volume. The cylinder 9 and external volume 13 are pressurized by a precision regulator 15 such that the pressure force just equals the part of the payload 3 weight carried by that mount 5. The connection between each air spring 5 and a payload 3 hard point is through a flexure universal joint 17. That allows relative pitch and roll between the payload 3 and mount 5. The cylinder body 9 of each airmount 5 (the part that does not move vertically with the payload) is fixed to ground through slender column flexures 19. The length and diameter of these flexures 19 is chosen to set the horizontal stiffness (equal in both directions) such that the desired horizontal-mode break frequency is achieved. Since the flexures 19 are loaded in compression by the payload 3 weight, their transverse stiffness is reduced by negative differential stiffening. A very low horizontal break frequency is obtained with practical flexure sizes. The arrangement allows very low suspension frequencies for all six rigid-body modes of the payload 3 on the mounts 5.

Horizontal 21 and vertical 23 voice-coil actuators act between the payload 3 and ground 25. A minimum of six are required for rigid-body position control of the payload 3. The AS/VIS design uses eight with four acting vertically and two in each horizontal direction. Horizontal 27 and vertical 29 displacement sensors detect the position of each actuator moving element relative to ground 25.

Accelerometers 31 (DC-coupled) sense the low-frequency acceleration of the aircraft floor in inertial space. A minimum of six accelerometers 31 are likewise needed. A controller 33 implements some specified dynamic relationship between the motion sensed by an inertial sensor 35 and the drive commands to each actuator 5. The controller 33 sends a signal to power amplifiers 37, which drive the horizontal 21 and vertical voice-coil actuators 23.

Vertical Airmount/Actuator

Figure 5A:
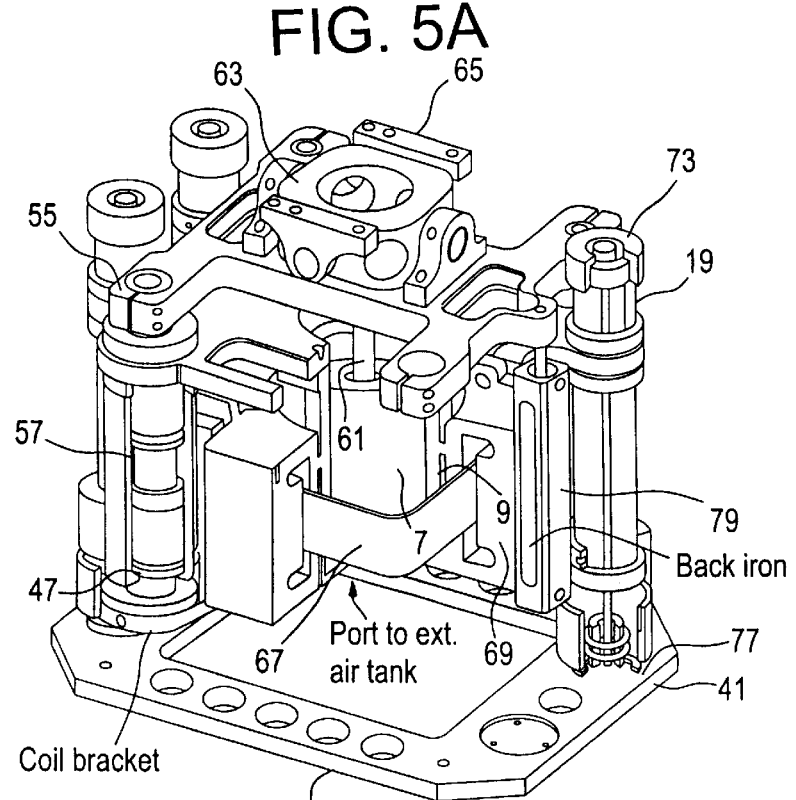
FIGS. 5A and 5B are a sectional view and a perspective view of a vertical airmount/actuator.
Figure 5B:
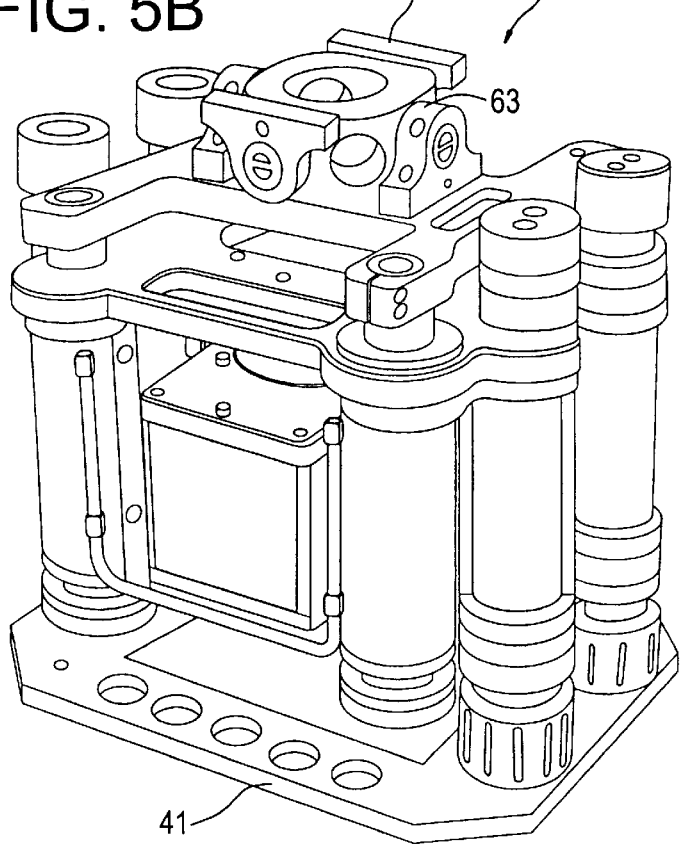
Figure 6A:
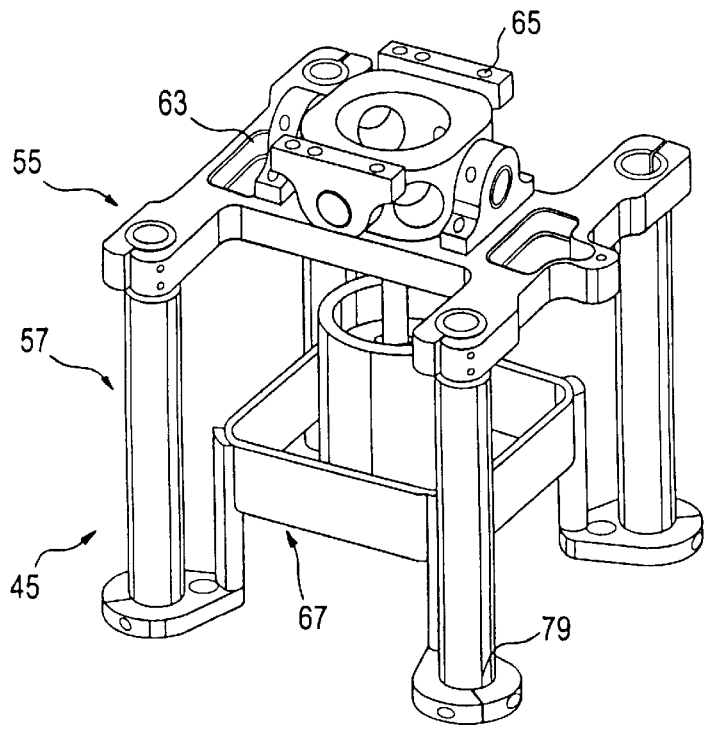
FIGS. 6A, 6B and 6C are perspective views of a carriage assembly, a baseplate assembly, and a magnet frame assembly of a vertical airmount-actuator.
Figure 6B:
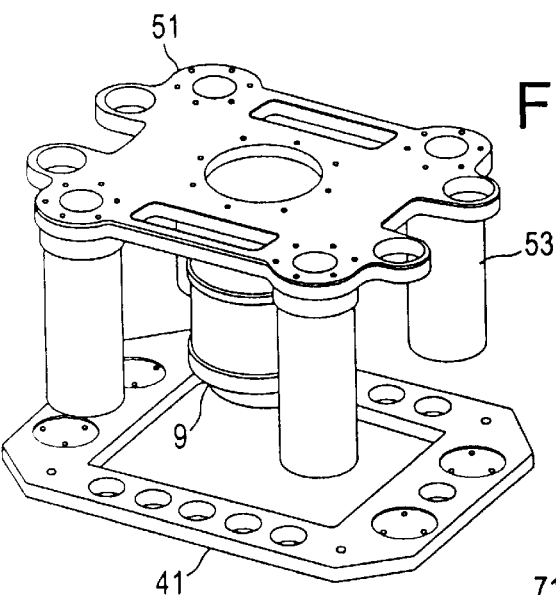
Figure 6C:
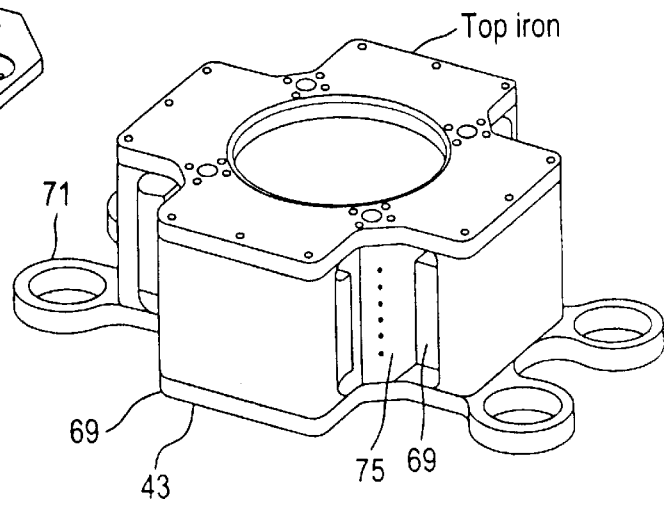

FIGS. 5A and 5B show a cutaway and a perspective view of a vertical airmount/actuator 5. FIGS. 6A, 6B and 6C show some subassemblies of the unit.

The vertical airmount 5 consists of three main assemblies. They do not correspond exactly to the subassemblies shown in FIGS. 6A, 6B and 6C. The baseplate 41 (also FIG. 6B) is fixed to the aircraft floor. The frame 43 (also FIG. 6C) is fixed vertically to the baseplate 41 but moves horizontally on the four flexure rods 19. The carriage 45 (also FIG. 6C) moves vertically on air bearings 47 relative to the frame 43.

The air cylinder 9 is positioned at the center of the unit and serves as a primary structural member of the frame 43. At its upper end air cylinder 9 supports the bearing plate 51, to which are fastened four cylindrical bearing housing tubes 53. The housing tubes 53 extend downward from the bearing plate 51. Inside each housing tube are mounted two air journal bearings 47. A total of eight air bearings are used per isolator.

The main parts of the carriage, as shown in FIG. 6A, are a crossmember 55, four tubular rails 57 that form the bearing journals, the air piston 7, a connecting rod 61, and a flexure U-joint assembly 63 mounted to the top of the crossmember 55. The two upper trunnions 65 of the U-joint assembly 63 fasten to the payload. When air pressure is applied to the piston 59, it lifts the piston 7, carriage 55, U-joint 63, and one point of the payload. The U-joint allows pitch and roll of the payload relative to the air mount frame 43. The air bearings 47 allow vertical motion of the payload relative to the airmount frame 43 (and thus relative to the aircraft floor) and the flexure rods 19 allow horizontal motion of the frame 43 (and thus the payload) relative to the baseplate 42 (and thus the aircraft floor). When the payload is mounted on several airmounts, the flexure rod action allows yawing motion of the payload, thus completing the six degree-of-freedom isolation mounting.

The piston 7 is a frictionless design that uses special internal air circuitry to produce an air bearing film around its skirt. It does not actually touch the cylinder 9, but rather uses a small, controlled air leakage to produce the required lubricating film. It is a key to obtaining high payload capacity, low stiffness, and zero friction. The lower end of the cylinder 9 is connected via a 1.5-inch-diameter line 11 to an external accumulator tank 13, as shown in FIG. 4. The tank volume is 2.0 gallons. That was chosen to give a 0.66-Hz pneumatic suspension frequency when used with the 4.0-inch-bore piston supporting 380 pounds. Connection to the tank is via a single line 11 so a larger or smaller tank can easily be substituted to adjust the passive stiffness. The connection to the precision regulator 15 feeding the air spring is made at the tank 13.

Voice coils 67 are used for actuators because they can provide highly linear, long-stroke actuation with adequate bandwidth. High energy, rare earth magnets are used with air jet cooling of the coils to obtain a high thrust/weight ratio.

The vertical actuator coil 67 is roughly square in plan view with rounded corners. It is positioned around the air cylinder 9 for compactness. The magnet frame 43, FIG. 6C, uses four magnet segments 69, one along each straight section of the coil 67.

The wire size and number of turns in the coil are optimized to produce a good combination of coil resistance, inductance, and wire packing fraction. The "bottom iron" 69 of the magnet frame 43, FIG. 6C, serves two purposes. It is part of the magnetic flux path and also serves as a primary structural member of the frame 43. The four "ears" 71 protruding from the bottom iron 69, FIG. 6C, mount flexure housing tubes 73 which extend upwards, fastening to the flexure rods 19 at their upper ends.

Cooling air jets for the coil are integrated into the center iron 75. A manifold distributes compressed air to a system of 24 jets, four at each corner of the center iron 75. The air is directed against the inside surface of the coil at each corner for cooling. Jet sizes and air pressure can be adjusted based on cooling requirements. Elastomeric bumpers are provided as travel stops for motion of the payload in all three directions. Vertical bumpers are provided by annular opencell foam pads mounted to the upper sides of the carriage feet 79, FIG. 6A, and to the upper sides of the bearing plate 51 surrounding the carriage rails 57. Horizontal bumper stops 77 are O-rings which surround the lower end of the flexure rods 19 and contact a cylindrical collar threaded onto the lower end of the flexure housing tubes 73. The snubbing collars may be lowered by rotating on their threads to lock the frame horizontally. They may likewise be raised to enable horizontal isolation. When raised, they limit horizontal motion to +/−0.5 inches before contact is made with the snubber O-rings.

A noncontacting LVDT displacement transducer 79 senses the vertical position of the carriage relative to the frame, as shown in FIG. 5A. All electrical connections to the airmount pass through a single cable and connector.

Horizontal Actuators

Figure 7A:
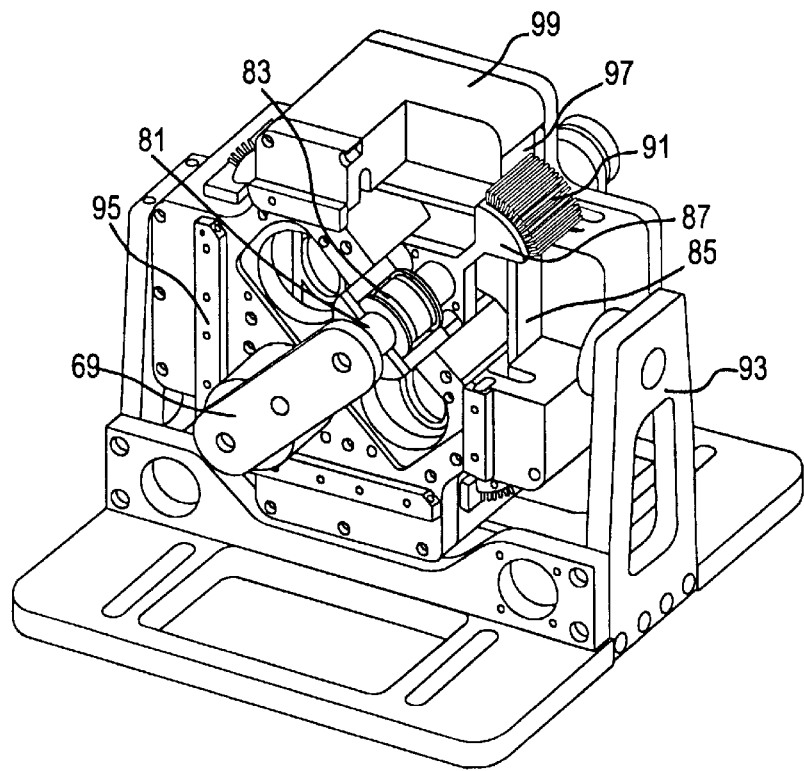
FIGS. 7A and 7B are a sectional and a perspective view of a horizontal voice-coil actuator.
Figure 7B:
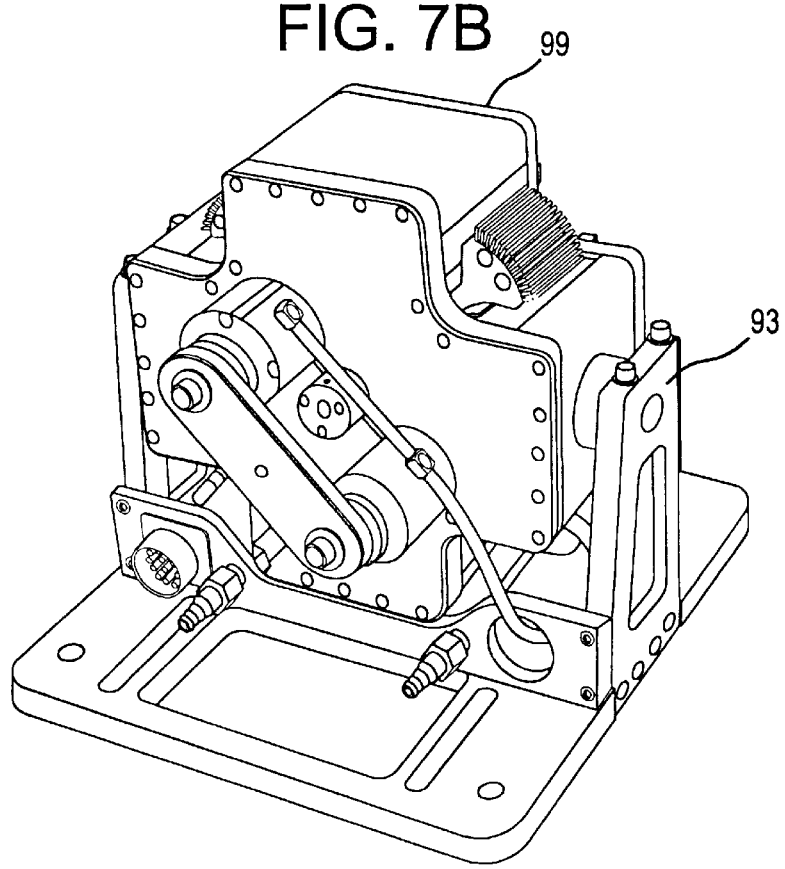

AS/VIS uses four horizontal voice coil actuators 21 in addition to the four vertical actuators 23. The magnetic design of the horizontal units is very similar to the verticals. Magnet segments 97 and coils 85 are identical, but back iron 99 geometries differ slightly. The carriage assembly of the horizontal actuator is much lighter since it carries none of the payload weight. FIGS. 7A and 7B show a cutaway and a perspective view of a horizontal actuator.

Referring to FIGS. 7A and 7B, the carriage uses two journal rails 81, each running in two air bearings 83. The bearing housings mount on the end irons of the magnet assembly. The rails 81 mount on the coil 85 via lightweight aluminum end frames 87. Two identical crossmembers 89 tie the rails 81 together at either end. A long pushrod, or stinger, transmits push-pull force from one crossmember to the payload. The pushrod uses ball joints at either end to avoid imposing moment on either the actuator carriage or the payload.

The only connection between the actuator carriage and frame is the two coil leads. The carriage runs on air bearings 83 so there is no stiffness or friction force induced by carriage motion.

One end iron of the magnet assembly incorporates a compressed air manifold 95 for coil cooling jets. These squirt air against the top edge of the coil along four sides, rather than against the inside corner surfaces as in the vertical actuators. In addition, the horizontal actuators have two small axial-flow fans flushing ambient air through the coils from the inside out. The exposed corners of the coil 85 mount finned aluminum heat sinks 91 for additional cooling.

A noncontacting LVDT, identical to that in a vertical airmount, senses carriage position relative to the frame. The LVDT is positioned along the axis of the actuator and is not visible in the cutaway drawing.

All electrical lines for the coil, fans, and LVDT run through a single connector on the base of the actuator.

The actuator body is carried in a trunnion mount 93 which allows the elevation angle of the thrust axis to be easily adjusted. Weight of the trunnion base 93 is included in the 96-lb weight of the actuator. Thrust to weight ratio is over 2.4:1, about twice that of commercial electrodynamic shakers in this size range. That is obtained at the expense of bandwidth that is not needed in the present application.

The relatively low frequency of the application is reflected in the fact that the coil is substantially heavier and has higher inductance than a commercial shaker of similar force rating.

Magnetic Actuators

Voice-coil actuators are used for both vertical and horizontal directions. Magnetically, the two designs are similar. They differ in that the vertical actuators are integrated with the air springs supporting the payload weight, while the horizontal actuators are stand-alone units that perform only the actuation function.

Each actuator has two main elements: a wire coil and a magnet body. The two are designed such that the magnet body produces a flux field normal to the wire over most of the wire length. A current passed through the coil produces a force normal to the flux and current directions (parallel to the coil axis). FIGS. 6A and 6C show the magnet body and coil separately for a vertical airmount. Force on a unit length of wire is the product of current and flux density. Maximum actuator force is determined by flux density in the coil, coercivity of the magnets (resistance to demagnetizing by the field from the coil), wire length in the flux, and maximum coil current. The latter is determined by heating of the coil.

Design of the actuator consists of determining a suitable arrangement of magnet, back iron, and coil. For AS/VIS, the design goal was to obtain a maximum force of at least 200 lbf with minimum weight. No hard maximum was set for weight, but it was noted that commercial electrodynamic shakers of that size range typically have thrust/weight ratios of about 1.

The highest commercial grade of magnet material is appropriate. That is grade 40 (energy product of 40 million Gauss-Oersteds).

Figure 8A:
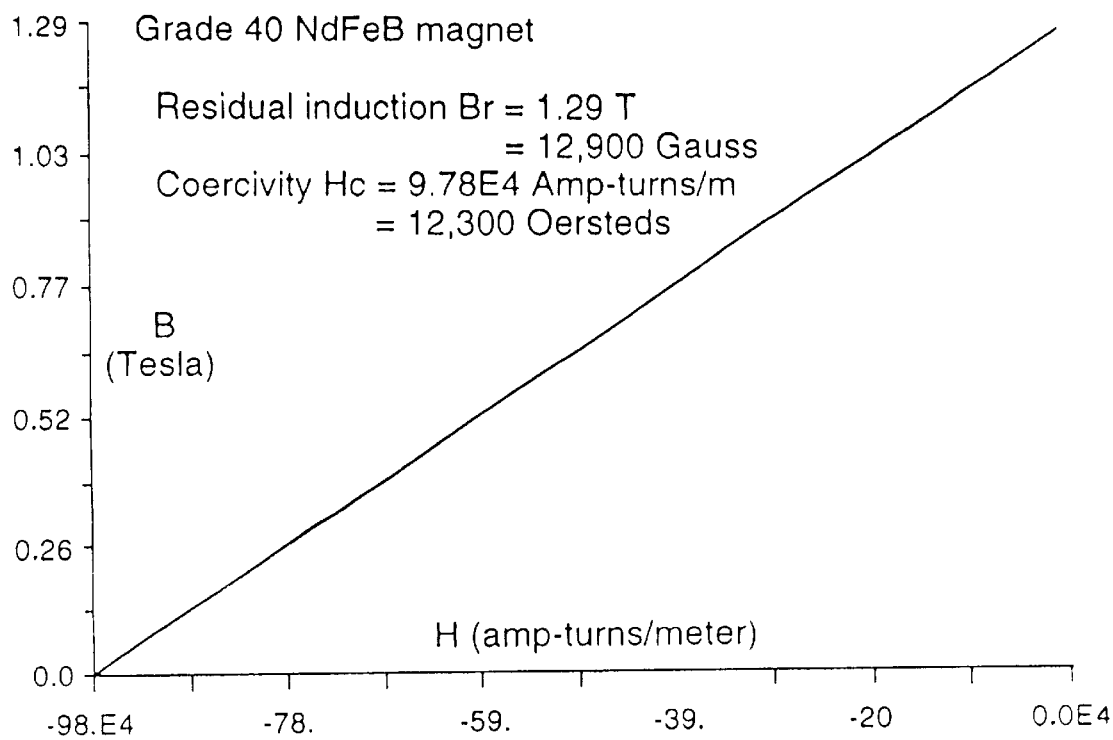
FIGS. 8A and 8B are a demagnetization curve for Grade 40 NdFeB magnet and a BH curve for back-iron material.
Figure 8B:
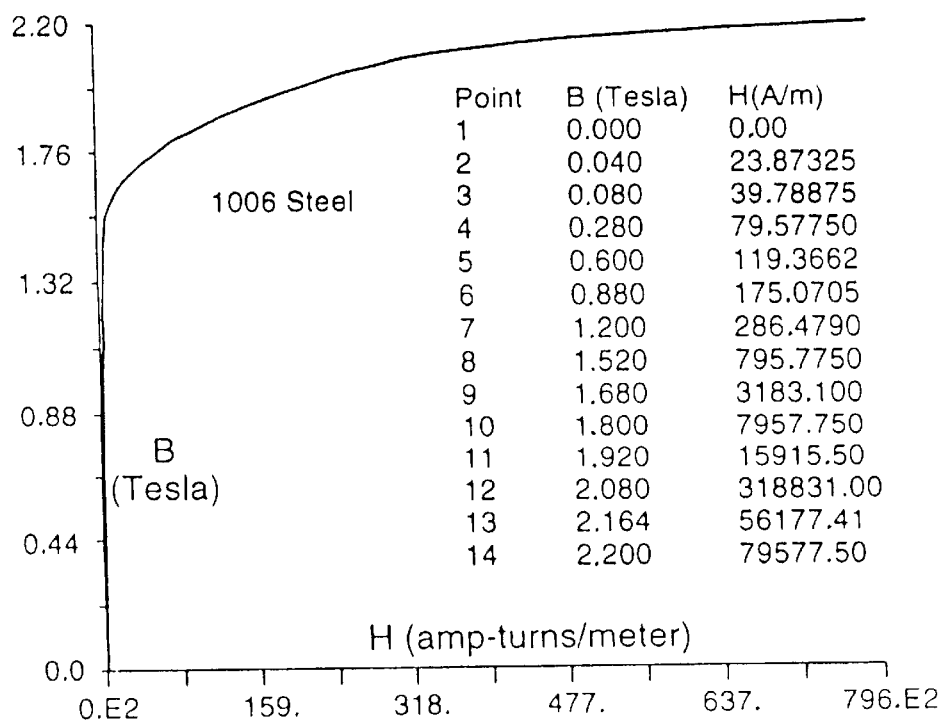

Analytical design of the magnet body was performed using a 3-D boundary element magnetostatics code. Input consists of a geometry description, B-H curves for the magnet and back iron, and a specified number of amp-turns for the coil. FIGS. 8A and 8B give material properties. Output is the flux field over the entire geometry and the net force on the coil. The flux field is then examined to locate areas of saturation in the back iron or low or uneven density in the coil.

Figure 9:
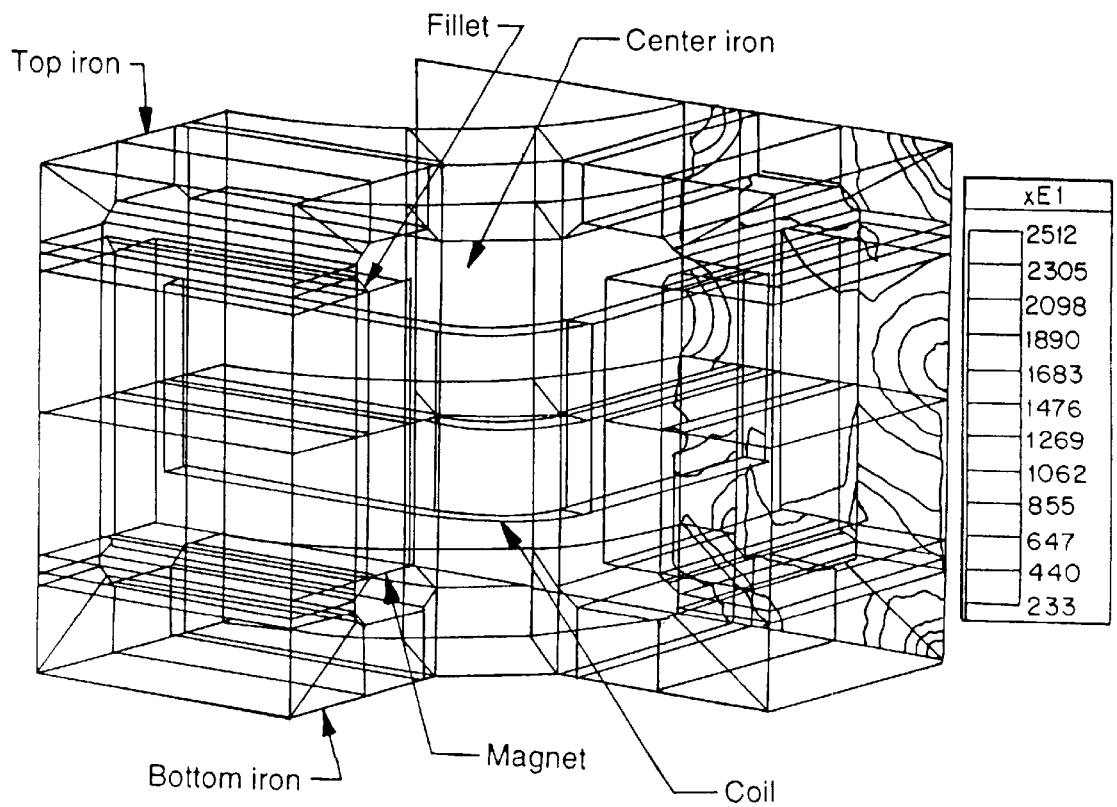
FIG. 9 shows the calculated flux field at a symmetry plane of a voice coil actuator magnet assembly.

The back iron geometry is adjusted to eliminate such areas. FIG. 9 shows a typical flux map. Such analyses were used to determine the force-current relation, the variation of force with coil position at constant current, and the coil inductance. The latter quantity is needed for designing the drive amplifier 37 (FIG. 4).

Figure 11A:
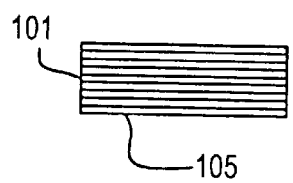
FIGS. 11A and 11B are side and top elevations of a coil.
Figure 11B:
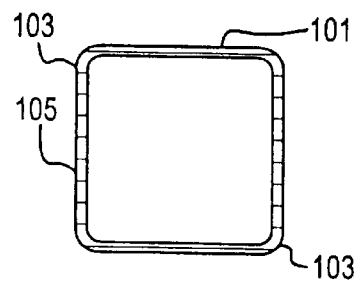

Certain practical constraints exist in the magnet assembly. Tensile strength of the magnet material is low, which requires that it is well supported by the back iron and not used to carry structural loads other than the magnetic force. Magnet material is very hard and brittle and is consequently quite expensive to machine. Shapes of magnet material must therefore be kept simple. Rectangles are best for low-volume applications where special tooling costs must be minimized. Annular segments allow an annular coil where force is developed over the entire wire length. However, that requires significant tooling investment. One preferred embodiment, shown in FIGS. 6A and 7A, uses a square planform coil 101 with radiused corners 103, as shown in FIGS. 11A and 11B. Magnets are rectangular slabs, magnetized through the thickness. Flux is imposed on the coil 101 along all four straight sides 105 with the corners 103 used either for heat sinks (horizontal actuators) or as mounting points for the brackets that transmit the coil force to the carriage (vertical actuators).

Extensive analysis was performed in optimizing the coil and magnet geometry. It was found that magnetic saturation was occurring in the back iron in areas where flux "turned the corner" as it entered the top and bottom iron. While some saturation is inevitable, it was found that soft iron fillets at the seams between magnet and back iron and between back irons and top/bottom iron reduces saturation and improves coil force with negligible weight penalty. Such fillets were added to the design, either as integral parts of the machined back irons or as add-on pieces where necessary. The location of some of the fillets is visible in FIG. 9.

Figure 10:
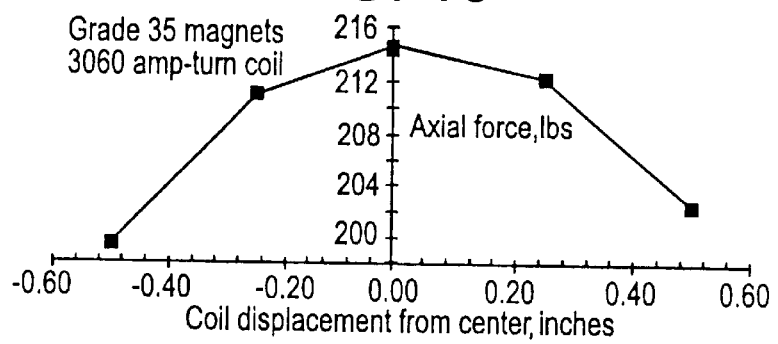
FIG. 10 is a graph of coil displacement vs. axial force for a magnetic actuator.

FIG. 10 shows calculated results for coil force at various coil positions along the nominal 1.0-inch stroke. The 200-lbf goal was met with some margin. Actual measured force is somewhat higher: 220–230 lbf.

The coil design is done concurrently with the magnet and amplifier design. It consists essentially of determining how many turns of what gauge wire should be used. More turns mean more force per unit current. However, as the wire gauge gets smaller, several limitations are encountered.

Coil resistance increases which means more heat per unit current. It also increases the required supply voltage for the amplifier and the maximum heat dissipation for a linear amplifier.

Coil inductance increases which affects the required compensation for stabilizing the current-drive power amplifier.

A greater fraction of the coil volume is insulation and bonding agent rather than copper. That reduces the mechanical strength and heat dissipation capability of the coil.

The number of interacting variables and the relationships between them are sufficiently complex that no one-pass optimum solution is possible. However, there is an approach that gives a workable solution. It uses the fact that there are only a fairly small number of wire gauges that are commercially available and physically suitable for coils of the required size. A spreadsheet was developed that calculated the parameters of interest (resistance, inductance, coil heating, amp heating, supply voltage, etc.) for all possible sizes. A scan through the possibilities eliminates the impractical ones, and picks the best from the survivors. FIGS. 11A and 11B show the resulting coil.

Analog Electronics

The AS/VIS system includes analog electronics, mostly custom but designed around off-the-shelf circuit boards and modules.

Acceleration Sensing

A dedicated system of 16 acceleration sensing channels is provided. It uses a commercial instrumentation-grade sensor with integrated preamplifier and a custom chassis for gain scaling, DC offset nulling, and display, as shown in FIGS. 12A and 12B.

Figure 12A:
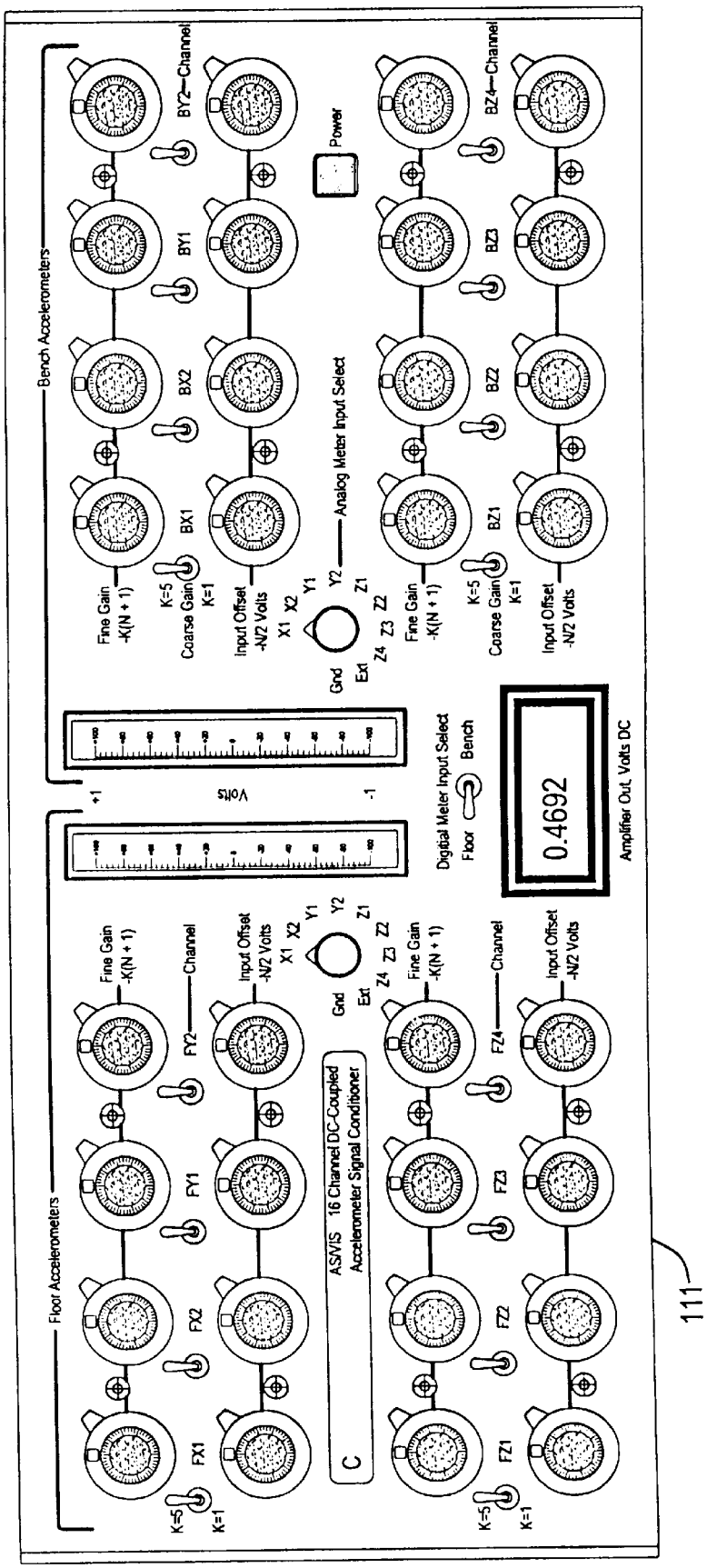
FIGS. 12A and 12B show front and back panels of a 16-channel chassis for DC coupled accelerometers.
Figure 12B:
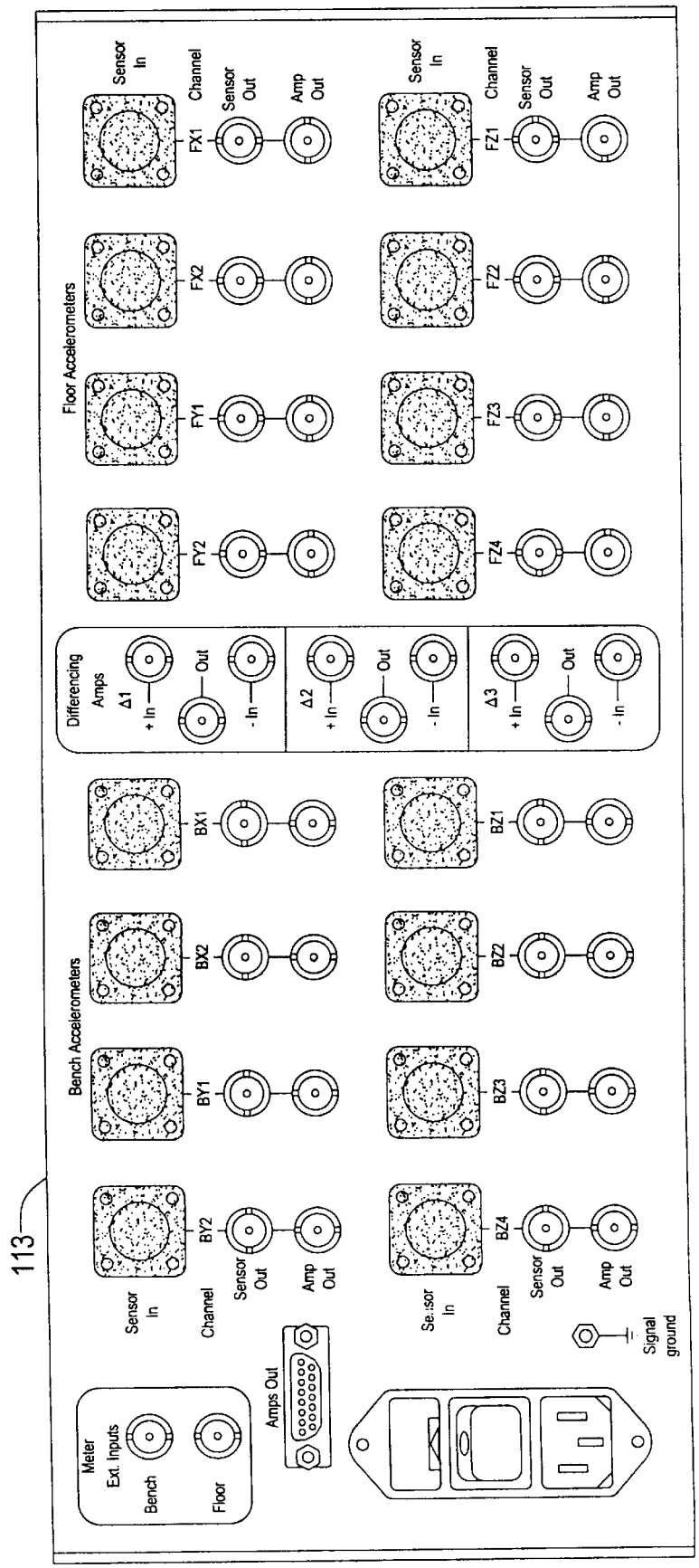
Figure 13:
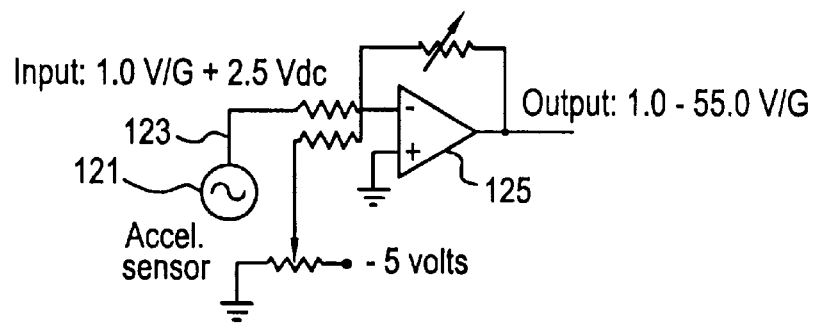
FIG. 13 is a schematic diagram of one channel of a 16-channel accelerometer system.
Figure 14:
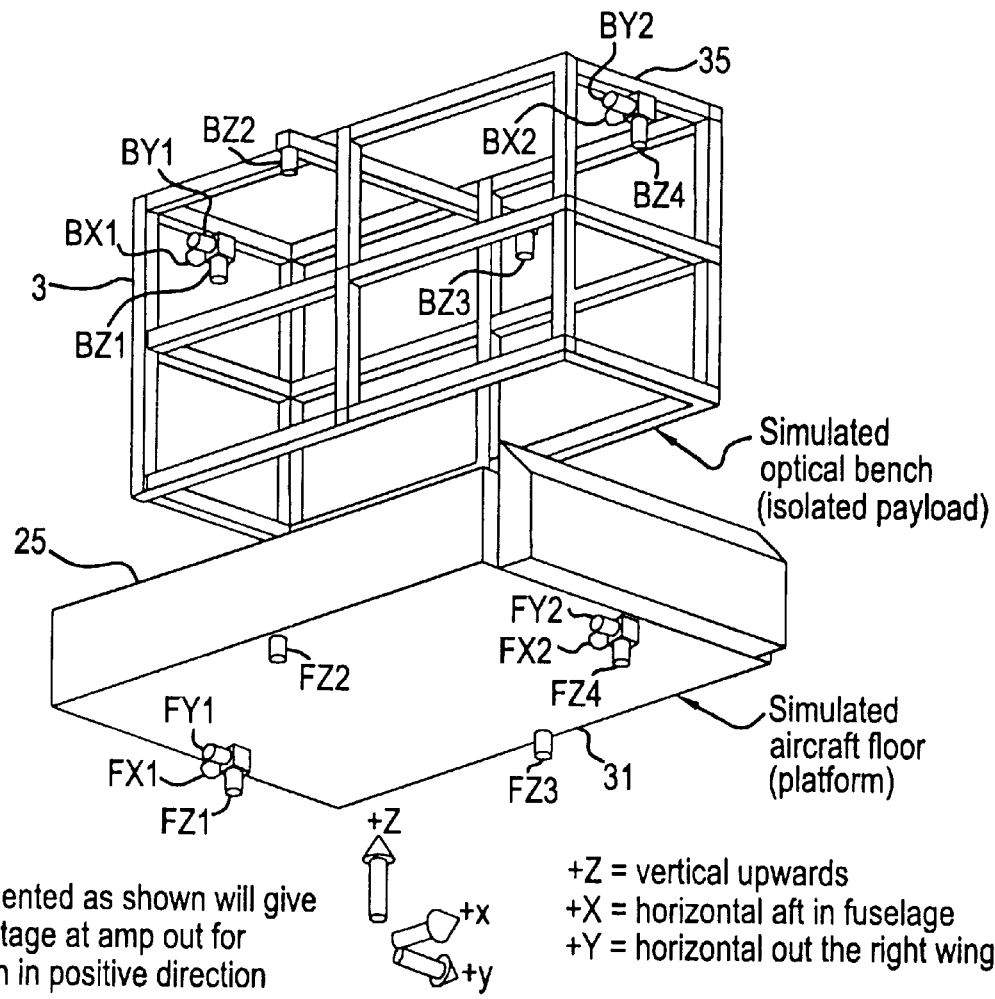
FIG. 14 is a perspective view of accelerometer locations on a vibrating test platform and payload.

FIGS. 12A and 12B show the front 111 and back 113 panel of the chassis. It provides power, I/O connections, front-panel gain and offset controls, digital readouts for calibration, and fast analog bargraph readouts for signal monitoring during operation. FIG. 13 shows a simplified diagram of one channel of the 16-channel system. FIG. 14 shows accelerometer locations on the platform 25 and payload 3.

The sensors 121 are a piezoresistive type fabricated along with their preamplifiers on a single silicon chip (IC Sensors P/N 3140-002). They are DC-coupled with a nominal bandwidth of 0–340 Hz (+5% amplitude). Their manufacturer gives no noise floor specification but simple tests at CSA have indicated that it is less than 0.0001 G rms. Gain is variable at the chassis front panel from nominally 1.0 to 55.0 volts/G. The signal 123 from the sensor 121 is nominally 1.0 volts/G with a +2.5 Vdc offset. Sensor range is +/−2.0 G, including the 1-G gravity field. The gain scaling amplifier 125 may add an offset voltage from 0 to −5.0 Vdc to null the DC output. A sensor may be calibrated by detaching it from the structure (leaving the cable in place) and rotating it with respect to the gravity vector to produce a known 2.00-G change in the measurand input.

Gain scaling/offset amplifiers are housed in a single chassis along with three channels of differencing amplifiers. The latter may be patched via back-panel BNC jumpers to the outputs of the various acceleration channels to obtain rotational accelerations.

Position Sensing

Relative position and orientation of the payload relative to the platform must be sensed. The likely usage of the displacement signals is in control laws. They may be used, for example, to implement local-loop uncompensated displacement feedback. The actuators would be used as simple linear or nonlinear springs for centering of the payload within its range of motion. Other more elaborate possibilities exist that are noted briefly in a later section on control laws.

Figure 15A:
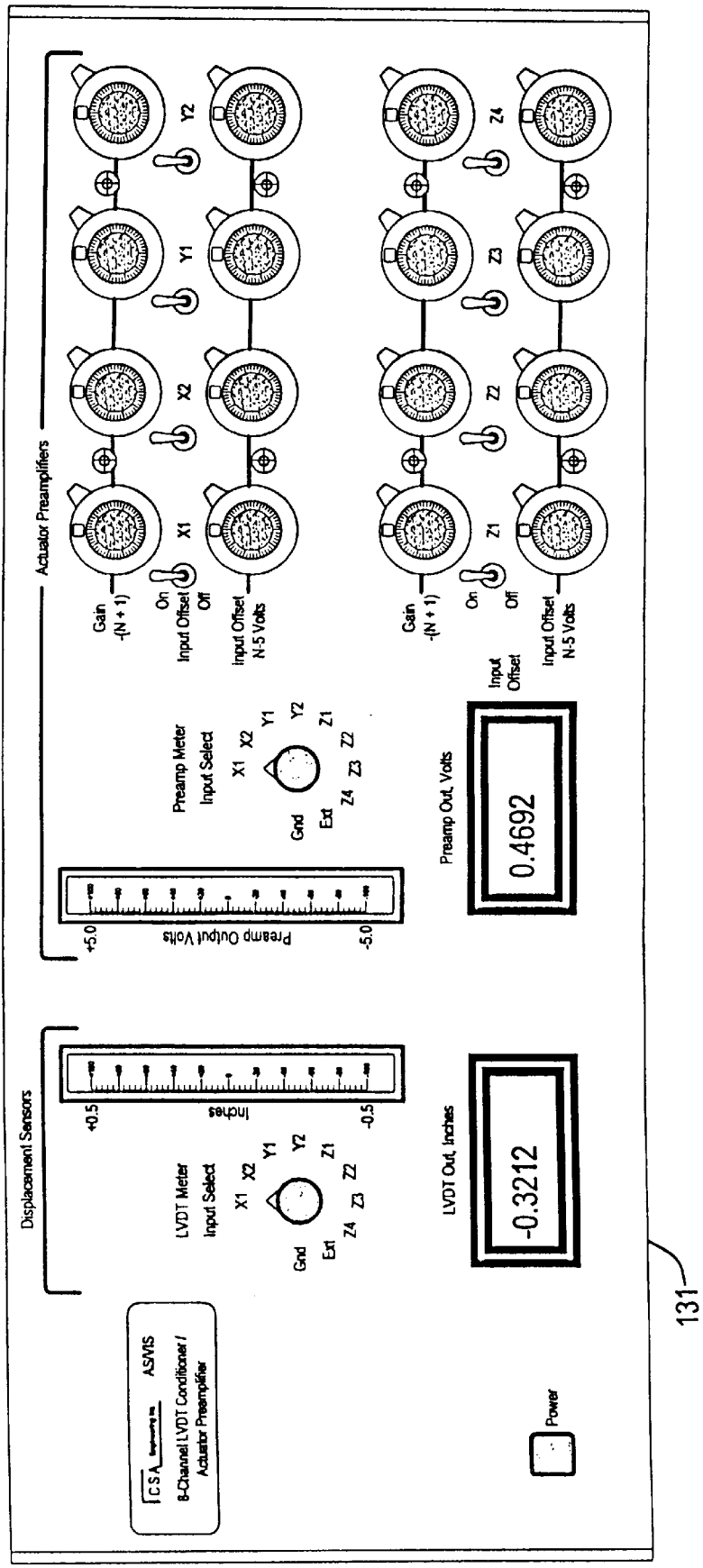
FIGS. 15A and 15B show front and back panels of an 8-channel chassis containing displacement sensor electronics and preamplifiers for actuators.
Figure 15B:
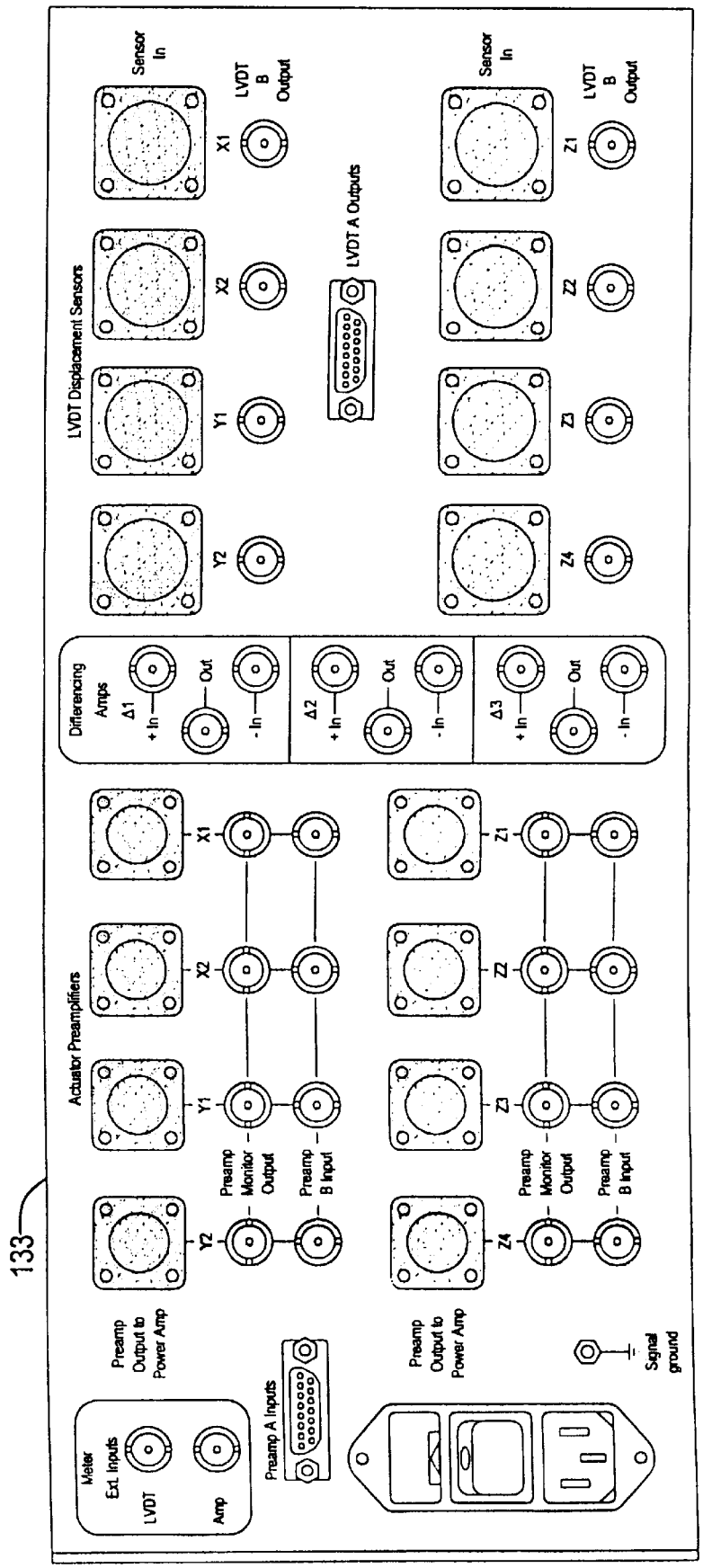

Commercial linear variable differential transformers (LVDTs, Schaevitz P/N HR500) are used for position sensing. Those are built into the actuators 5. Commercial board level amplifiers 169 (Schaevitz P/N LVM110) are used in a custom chassis. FIGS. 15A and 15B show the front 131 and back 133 panels of the chassis. It provides power, I/O connections, and a digital readout for calibration. The chassis also contains eight preamplifiers for the actuator coil-drive amps that are described in a later section.

The range of motion and center position of each actuator are accurately known in advance. Therefore, the desired zero and gain settings are fixed in advance and there is no need for front-panel controls. Calibration is done via trimpots on the individual amplifier boards inside the chassis. Gain of each is set at 10.0 volts per inch with zero volts corresponding to midstroke of the actuator. Nominal dynamic range of the sensors with their amps is over 60 dB, corresponding to a resolution of better than 0.0005 inches. Bandwidth is nominally 250 Hz (3 dB) and can be set wider by jumper changes on the board although this will tend to raise the noise floor.

Power Preamps and Amplifiers

Each voice-coil actuator has a discrete amplifier and preamplifier.

Figure 16:
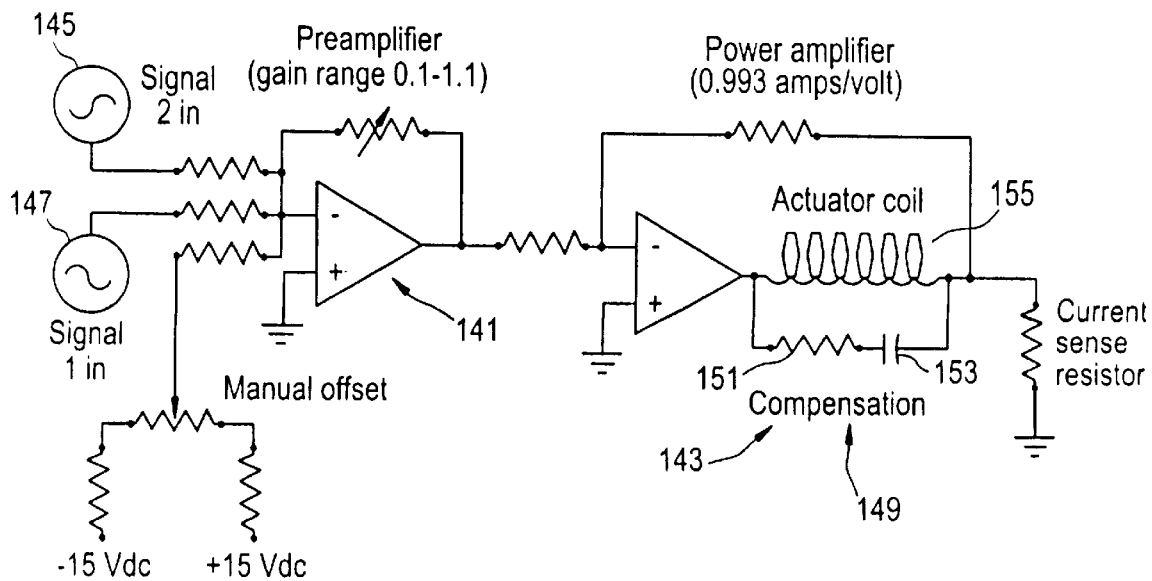
FIG. 16 is a schematic diagram of a preamplifier and amplifier for an actuator.

FIG. 16 shows a simplified diagram of the power preamplifier 141 and amplifier 143 for one of the eight actuators. The preamplifiers, housed in the chassis shown in FIGS. 15A and 15B, are commercial, board-level operational amplifiers (Calex P/N MK155). They are used as single-ended, inverting preamps with gain controlled by a potentiometer in the feedback path. Gain range is 11:1. The preamp may also act as a summing amp with two inputs 145 and 147. One is normally from the D/A converter of the control computer. The other may be from an external source if an actuator is to be used as a disturbance source for testing. It may also be from the LVDT output to close a simple displacement loop. That allows testing without the control computer and may, with some control laws, be used to reduce the CPU real-time computing load.

Figure 17A:
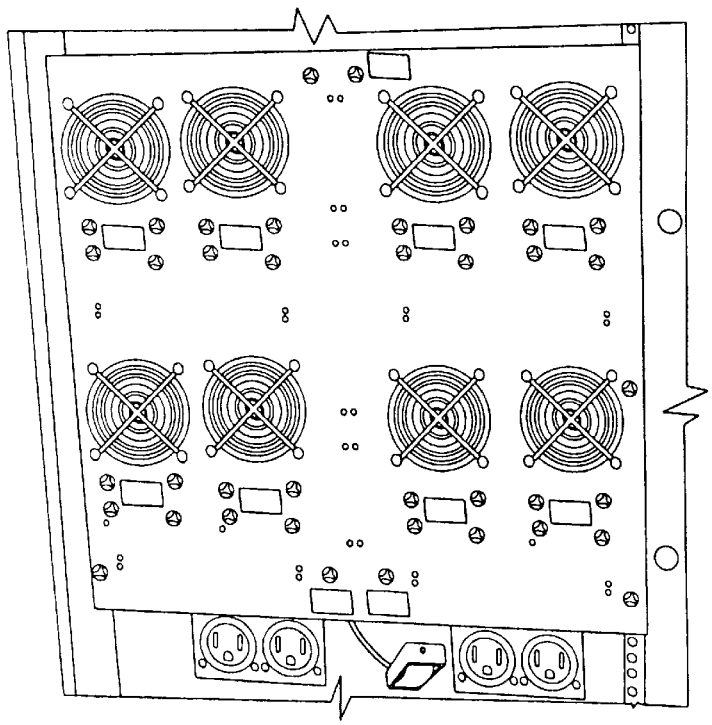
FIGS. 17A and 17B are a front view an 8-channel power-amplifier and a perspective view of an amplifier module.
Figure 17B:
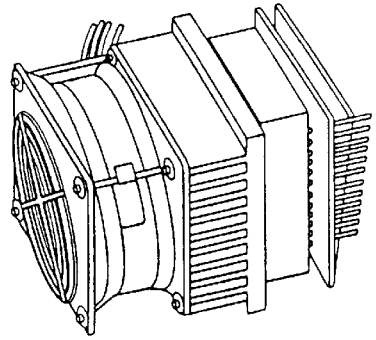

The power amplifiers 37 (Inland P/N EM19) are linear H-bridge units that integrate the amplifier module, heat sink, and cooling fan into a single package. FIGS. 17A and 17B show one module and the rackmount panel carrying all eight power amplifiers with their inhibit switches, pilot lights, I/O connectors, and other miscellaneous accessories.

Using the power amplifier (or any linear amplifier) in a current drive mode with an inductive load such as a voice coil requires compensation to stabilize the system. The compensation 149, shown in FIG. 16, is a series combination of resistor 151 and capacitor 153 in parallel with the coil 155. In effect, this is a second feedback path which dominates over the first (the coil) at high frequencies where the primary path would induce too much phase lag and render the amplifier unstable.

That circuit is slightly different from that usually used in current drive linear amplifiers. It allows the compensation elements to be mounted at the actuator rather than at the amplifier, an arrangement that has packaging advantages in this application.

Figure 18:
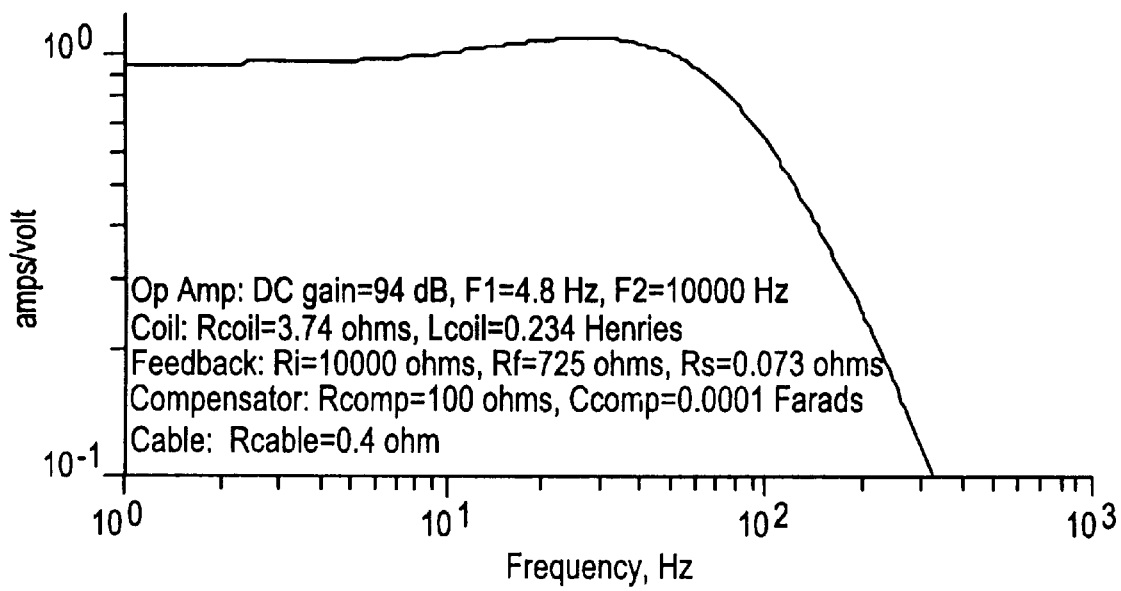
FIG. 18 is a graph of the closed-loop frequency response of an amplifier.

Mathematical models of the actuator coil, power amplifier, and its compensation were developed for choosing the values of the compensator elements. Coil inductance was calculated by the magnetostatic model described earlier. FIG. 18 shows the resulting closed-loop frequency response of the amplifier. While the 3 dB bandwidth is adequate at just under 100 Hz, it should be noted that the phase margin is not set at the bandedge. Rather it is set at lower frequency (in this case around 60 Hz), where the open-loop phase goes through a relative minimum.

Digital Control Hardware and Software

AS/VIS includes both a real-time control processor and a development host.

Figure 19:
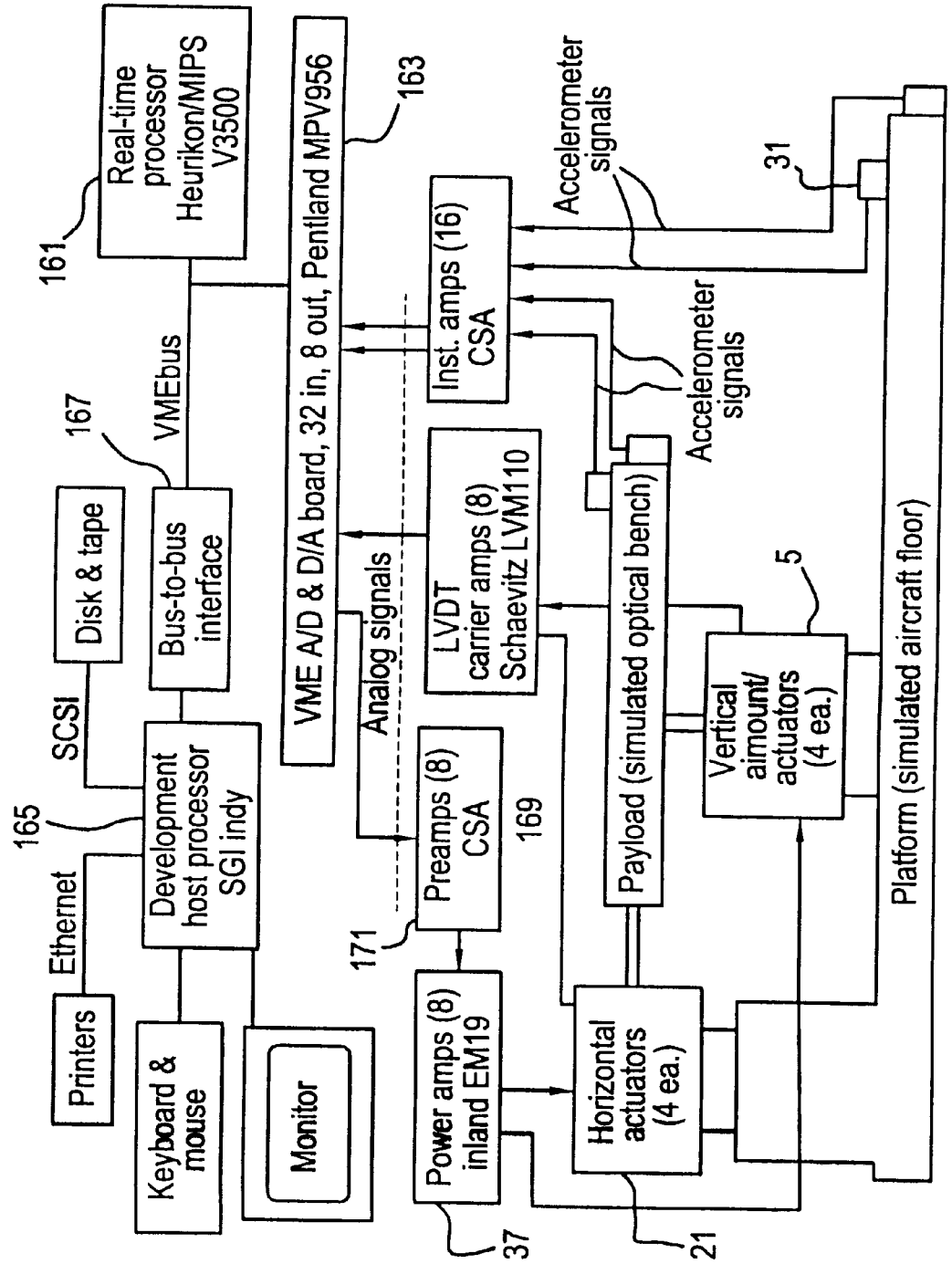
FIG. 19 is a block diagram of the system controller hardware for the AS/VIS hardware.

A block diagram of the system hardware is shown in FIG. 19. It uses a VMEbus for the real-time processor 161 and its peripherals. That industry-standard architecture is widely used in industrial automation and is well suited as the basis for flight systems. Board-level processors and peripherals of all types are available from dozens of manufacturers.

The processor 161 is a Heurikon/MIPS V3500 rated at 31 SPECfp and 33 SPECint. It has proven more than adequate for running the control algorithms developed within this project. It has since been superseded. As a VMEbus board based on a MIPS chip, it may be replaced quite easily with a faster, more recent version if desired. The logical replacement at present is a Heurikon processor based on the MIPS R4700 chip which is 2–3 time faster and uses less power.

The analog interface in provided by a 32-channel A/D and 8 channel D/A on a single VMEbus board 163 (Pentland MPV956). The combination of processor 161 and analog board 163 has proven capable of 1000 SPS in true, deterministic real-time control using the control law.

The host computer 165 is a Silicon Graphics Indy workstation built into a common chassis with the VMEbus system. Data transfer between the two is via a bus-to-bus interface 167 (Bit3 P/N 607). That fast interface allows the host computer to be used with a graphical interface for real-time data monitoring during operation.

The software system and real-time kernel are VxWorks from Wind River Systems. That environment provides a large variety of software tools and debugging aids. While relatively expensive, it is widely used, well supported, and features a stable, reliable real-time kernel.

Actuator Tests

Figure 20:
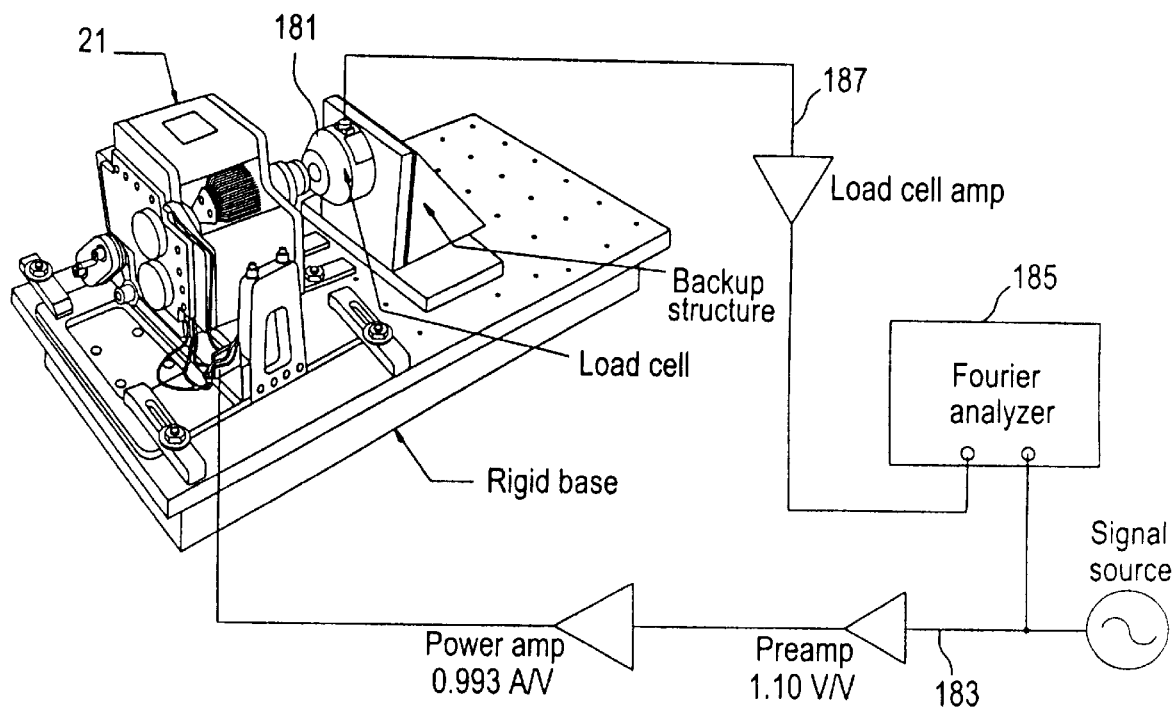
FIG. 20 is a perspective view and schematic representation of a test setup for the horizontal actuators.

The horizontal actuators 21 have been tested to verify force capacity, force/current ratio, and frequency response. FIG. 20 shows the test setup. The actuator trunnion is fixed to a rigid base and the carriage is fixed to a rigid bookend fixture through a load cell. A DC or random voltage signal 183 is applied to the actuator preamplifier and the resulting force from the actuator is sensed by the load cell 181. For static measurements, voltage input to the preamp and output from the load cell 187 are measured point by point with a digital voltmeter. For dynamic measurements using random input, the output and input voltages are applied to the numerator and denominator channels respectively of a digital Fourier analyzer 185 and the frequency response is measured. Coil temperature was also measured during static tests by means of a noncontact infrared thermometer.

In addition to dynamic tests described later, vertical actuators were tested statically by operating them against a constant force developed by the air piston. That constant force was determined by measuring the piston air pressure with a mechanical gauge and using the known piston area to calculate force.

Coil cooling is quite adequate, at least at sea level. Coil temperature never exceeded 200 degrees F under continuous full load using only the cooling fans. The compressed air cooling jets were found to be unnecessary. The manufacturer of the coils rates them conservatively for a maximum temperature of 302 degrees F although a nominal design maximum of 250° F. was set for this application. Running the coils too hot causes heating of the magnets, which reduces actuator force/current ratio. While the effect is reversible, it is undesirable from a control standpoint.

Figure 21:
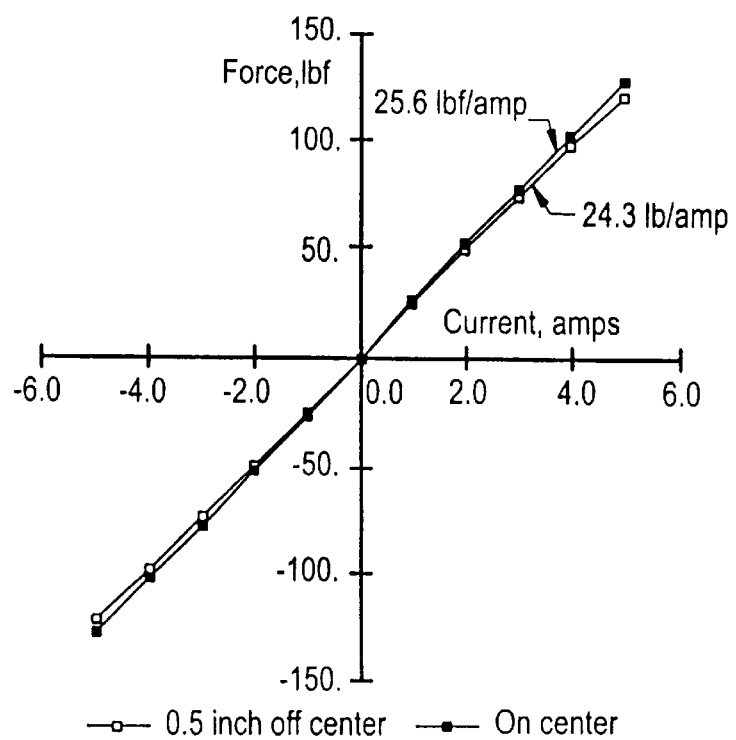
FIG. 21 is a graph of the static test results for a horizontal actuator.

FIG. 21 shows static test results for a horizontal actuator. Force/current ratio was found to be nominally 25.6 lbf/amp with the coil centered in its stroke and slightly less near the ends. Force is highly linear with respect to current at a fixed coil location. Static tests of a vertical actuator gave a slightly lower value, nominally 24 lbf/amp. A slight nonlinearity between force and current was noted near full load but the horizontal actuators were found to give 232 lbf output at 10 amps. That is well over the target of 200 lbf and was quite satisfactory.

Figure 22:
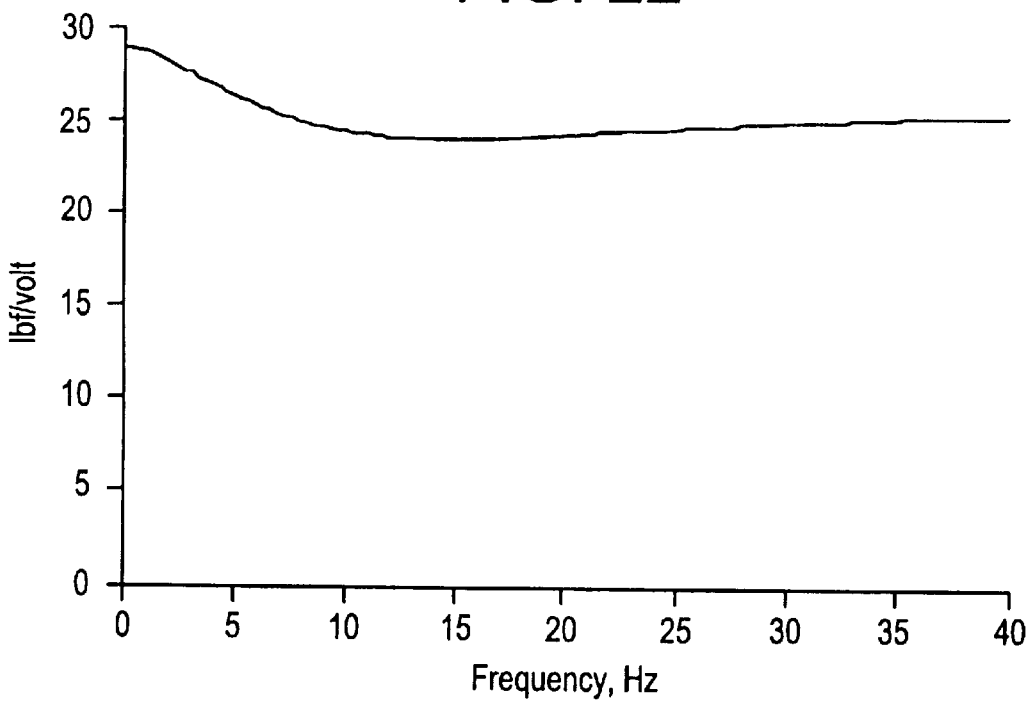
FIG. 22 is a graph of the results of the blocked-force frequency response testing of a horizontal actuator.

FIG. 22 shows the results of blocked-force frequency response testing of a horizontal actuator. Some mild dynamics are evident in the low frequency range below about 20 Hz. That is still unexplained but the cause is suspected to be amplifier-load dynamics and/or eddy current losses in the actuator back irons.

System Test Apparatus

Figure 23B:
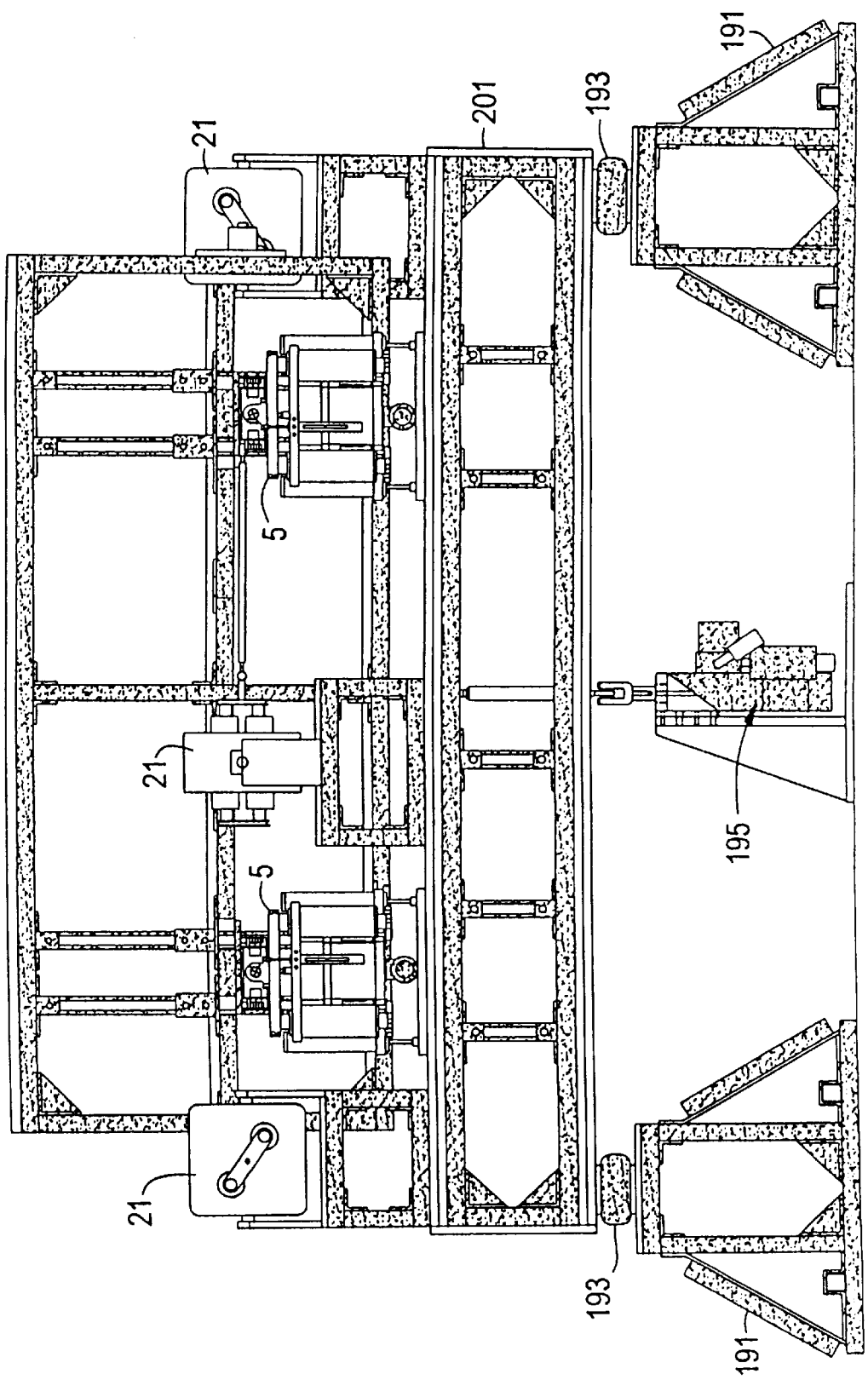

An apparatus was designed and built to allow testing of AS/VIS at the full system level with four vertical airmounts and four horizontal actuators. Illustrated in FIGS. 3, 23A and 23B, it is essentially a vibrating platform to simulate the aircraft floor in flight and a payload structure simulating an optical bench. The latter is supported on the former by the four AS/VIS vertical mounts 5. The four horizontal actuators 21 mount to the platform and act against the isolated payload, two in each horizontal direction.

A typical test configuration, shown in FIG. 3, has the payload loaded to a total weight of about 1400 lb with its C.G. slightly below the plane formed by the interfaces to the vertical airmounts.

The platform is supported off the lab floor by pedestals 191 and air bag springs 193 as shown. That gives a fairly low mounting stiffness that allows the platform to be shaken vertically by a servohydraulic actuator 195 mounted to the floor beneath the platform. The shaker 195, not part of the deliverable AS/VIS system, has a dynamic force rating of 2000 lbf and a bandwidth of several hundred Hz, depending on load dynamics. It may operate in either displacement control or force control modes but cannot operate in acceleration control. For AS/VIS testing, it is limited to displacement control because of space limitation that prevents mounting a load cell between the hydraulic shaker and the platform.

Each vertical airmount and horizontal actuator is controlled through a single electrical cable. Horizontal actuators may have two compressed air lines, one for air bearings and one for cooling air. Vertical actuators may have three air lines: one for bearings, one for cooling jets, and one for the air piston. The air piston line runs to the accumulator tank mounted under the platform rather than to the airmount itself. Pneumatic controls for the air piston are mounted in the control rack. All other air controls are in the console mounted to one end of the platform.

The servohydraulic shaker can be positioned in different locations under the platform to accentuate plunge, pitch, or rolling motions. All data shown here had it centered under the platform to accentuate plunging.

Figure 24:
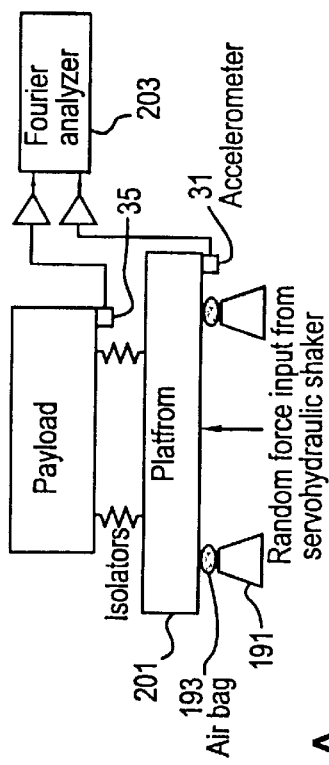
FIG. 24 is a block diagram of a testing setup.

System-Level Isolation Tests FIG. 24 shows schematically the arrangement for system level testing. The platform 201 is shaken vertically by the servohydraulic actuator. The payload weight is 1420 lbs and all actuators are operating with simple negative displacement feedback. Loop gain (stiffness) of the vertical actuators is set to 24 lbf/inch and horizontals to 25 lbf/inch.

Those values correspond to calculated isolation corner frequencies of 1.05 Hz for the vertical plunge mode and 1.26 Hz for both horizontal translation modes.

Signals from the various accelerometers 31 and 35 are processed by an eight-channel digital Fourier analyzer 203 (Zonic Model WCA). Typical measurements include the spectra of acceleration and the ratios of Fourier amplitudes of acceleration on the payload and on the bench.

Figure 25B:
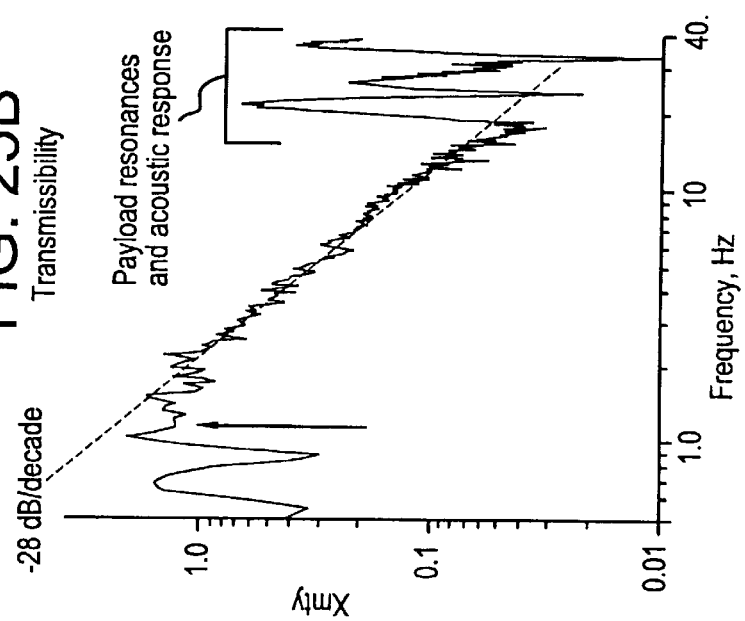
FIGS. 25A and 25B are graphs of the acceleration spectra and the transmissibility of the AS/VIS between 0.5 and 40 Hz.
Figure 25A:
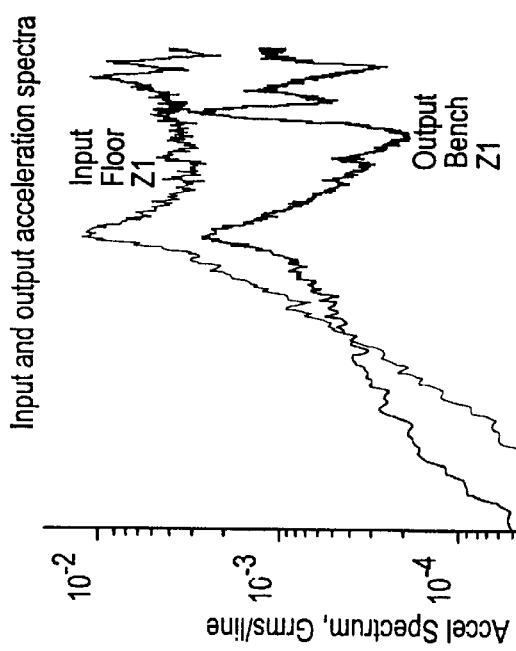

FIGS. 25A and 25B show the results of a typical system. Platform accelerometer FZ1 (31) and payload accelerometer BZ1 (35) are used, as shown in FIG. 14. Excitation is vertical and near the center of the platform. The exciter is operating in displacement control with a command signal that is random with a flat spectrum from 0.5 to 40 Hz. The left plot shows spectra from FZ1 and BZ1 and the right plot shows their ratio, calculated as a frequency response function (FRF). That is, the FRF is obtained as the ratio of cross power between the two signals divided by the autopower of FZ1 with both numerator and denominator estimated by ensemble averaging. The spectra are in units of rms acceleration per spectral line. That is obtained by multiplying the acceleration power spectral density by the analyzer resolution bandwidth and taking the square root.

Several points to note regarding this measurement are as follows.

The isolator corner frequency is not clearly visible in the FRF. That is due to poor coherence between the signals at low frequency caused by the fact that a flat displacement spectrum produces little input acceleration at low frequency. Nonetheless, the rolloff between 2 and 20 Hz makes it clear that the corner frequency is slightly over 1 Hz.

Isolator rolloff is only visible up to about 25 Hz. Above that, response on the payload is amplified greatly by lightly damped resonances of the payload itself. Acoustic excitation of the payload also becomes significant at higher frequencies. Both effects are common problems in isolation, even though they are independent of the isolators themselves. For now, their importance is that they mask the isolator performance. An eventual solution may be structural improvements to the test payload to increase its stiffness.

The rolloff is slower than predicted, about 28 dB per decade. That casts suspicion more on the measurement itself than on the isolators, as will be shown in later data.

The platform acceleration shows a distinct peak at about 7 Hz. That is not the suspension resonance frequency but is produced by the combination of platform dynamics and the characteristics of the shaker control system. It is not entirely unwelcome since the true airframe floor acceleration may well have peaks in this range due to wing bending modes, etc.

Figure 26A:
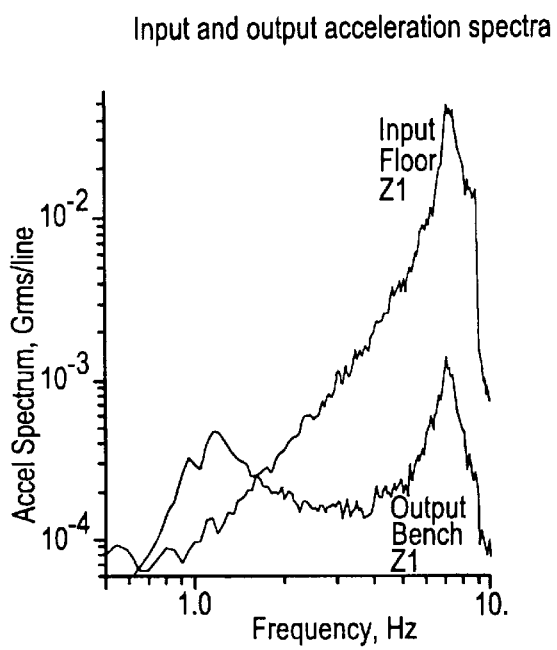
FIGS. 26A and 26B are graphs of the acceleration spectra and the transmissibility of the AS/VIS between 0.5 and 9.0 Hz.
Figure 26B:
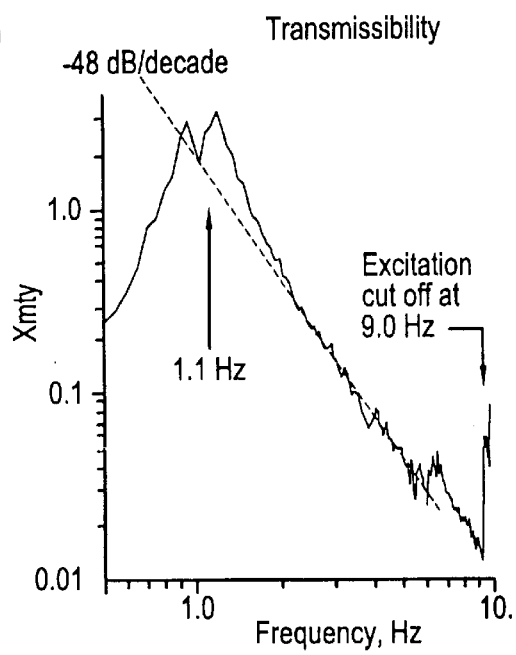

Tests were run with the input spectrum lowpass filtered to 0.5 to 9.0 Hz. Results are shown in FIGS. 26A and 26B. The format is the same as in FIGS. 25A and 25B.

As expected, this measurement gave much improved (though not perfect) coherence in the 1–9 Hz range. The break frequency is now clearly evident at 1.1 Hz, in good agreement with the predicted value of 1.05 Hz. Rolloff is much closer to the expected value of 40 dB/decade. The input acceleration spectrum is still not adequate at very low frequency (below 1 Hz). The FRF amplitude must approach unity as frequency approaches zero but the test input was not adequate to show this trend. Such a very-low-frequency test is probably impossible with the existing test setup because of the stroke limit on the air bag mounts for the platform.

Other System Level Tests

A quite different test was performed to provide a simple, highly visual demonstration of AS/VIS performance. Two pencil lasers were mounted on the test apparatus, one on the platform and one on the payload. The shaker was mounted under one end of the platform to produce significant pitching motion as well as plunging. A sinusoidal signal of 10 Hz was input and the amplitude was adjusted to give a vertical acceleration of about 0.5 G peak at the end of the platform over the shaker. That level is quite severe, and would make it highly uncomfortable for a person to sit on the platform.

Figure 27:
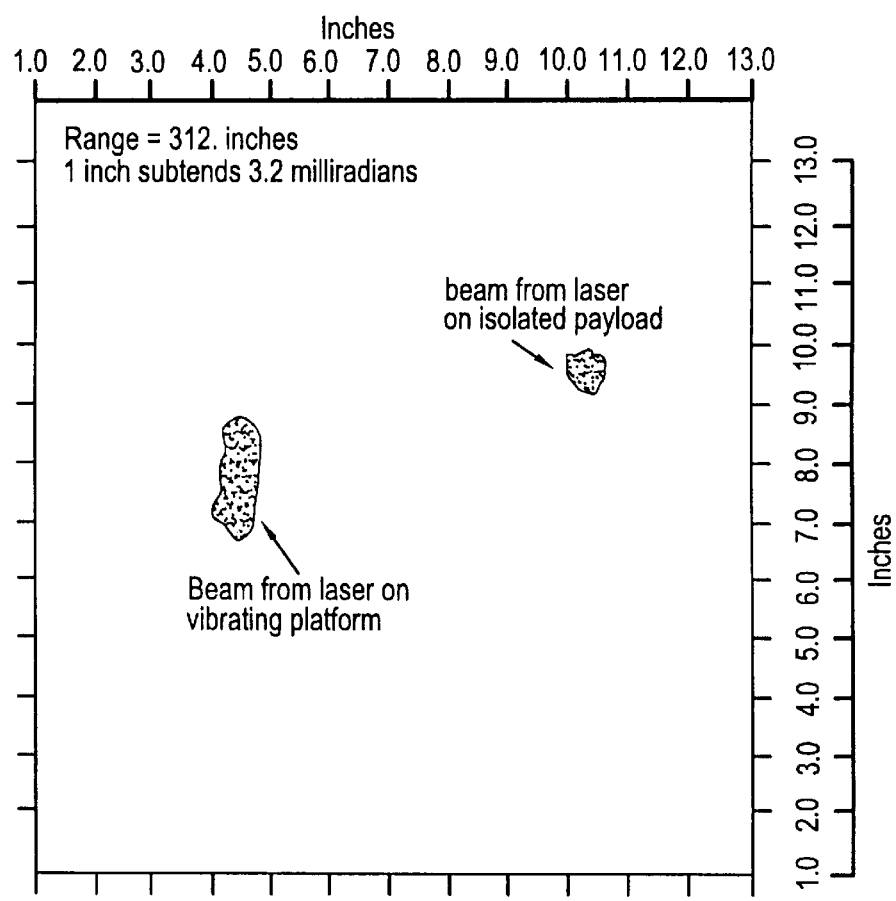
FIG. 27 shows laser beams projected from a vibrating platform and from an AS/VIS isolated payload.

Both laser beams were projected on a paper target about 25 feet away. FIG. 27 shows a photo of the laser spots. The spot from the payload laser stands virtually still while the other oscillates over a distance of about 1.5 inches. FIG. 27 does not entirely convey the effect because of difficulties in photography. The lasers were not of equal power. An exposure that captured the dimmer, moving image from the platform laser made the image from the brighter stationary, payload laser tend to bloom into a large spot. But in person, the demonstration is quite dramatic.

Component-Level Isolation Tests

The system-level isolation measurements described in the last section are limited by resonances of the dummy payload which begin in the 20–25 Hz range. An attempt was therefore made to measure the isolation performance of a single airmount supporting a rigid payload. The motivation was that the single-unit payload could be much more compact and dense than the dummy optical bench structure used in system tests (FIGS. 23A and 23B) and would therefore have higher natural frequencies. This would extend the usable test frequency range.

Vertical isolation was of primary concern because it is obtained through pneumatic springs that cannot be completely modeled from first principles. Component-level tests were therefore used to benchmark the behavior of a pneumatic spring for various sizes of its accumulator tank. While the effect of tank size is easily predicted for an air spring without inflow or leakage, the real case is more complex and depends on the behavior of the pressure regulator.

Test Method

The test method is shown in FIG. 28. A known test weight is supported by the isolator under test. The weight is constructed to make its natural frequencies high relative to the upper limit of the test band.

In a direct tranmissibility test (FIG. 28), the isolator 213 under test is placed on a moving platform 211 which may be shaken vertically such that a controlled base motion is produced. Vertical accelerations on the base 211 and on the payload 215 are transduced. The frequency response between the former and the latter is measured under random base motion input. That function, called Ĥ(f) is the desired transmissibility with no further processing required, hence the designation "direct" test.

Test Apparatus and Procedure

The apparatus for conducting a direct transmissibility test is shown in FIG. 29. A controlled vertical motion is imposed on the base 131 of the airmount 233 under test by a second identical airmount 235 supporting the first as shown. In effect, the lower airmount 235 is used as a shaker for testing the first. The airmounts are actually well suited for use as low-frequency, low-amplitude shakers. The air spring provides soft support for the weight of the test article and the actuator provides up to about 65 lbf rms force (200 lbf peak random) without forced air cooling. The low stiffness of the air spring allows almost all the coil force to be reacted into the inertia of the payload 237.

The air piston easily supports the 146-lb weight of the isolator 233 under test plus its payload 237 of up to several hundred pounds. Obtainable base acceleration levels of 0.1–0.2 G rms are consistent with expected in-flight levels.

Both lower 235 and upper 233 airmounts were modified by adding a machined load plate 239 to the top of the flexure U-joint 241 as shown. The plates 239 include steady legs 243 which brace against the carriage crossmember to hold the plate 241 level. The plate allows a weight to be supported by a single isolator. It also provides alignment such that the weight c.g. may be accurately positioned over the center of the airmount carriage. The "stack" of two isolator/actuators plus test weight were positioned under a gantry with a chain hoist for handling the test weight. A noncontacting safety loop was used around the lifting bar of the test weight during testing.

A vertical airmount/actuator provides both vertical and horizontal isolation. However, its design allows the horizontal isolation to be locked out without affecting the vertical, as shown in FIGS. 5A and 5B. Both upper and lower airmounts in FIG. 29 were configured in this way for testing.

Instrumentation

In theory, the displacement sensors built into the two isolators would be sufficient for measuring transmissibility. In practice, this leads to accuracy limitations due to subtractive cancellation error. Therefore, accelerometers were used on the moving base platform and test weight platform as shown.

The test required only two accelerometers, both measuring in the vertical direction. Those were mounted on the undersides of the two load plates as shown. The accelerometers were Wilcoxon Model 731A's with matched P31 power supply/couplers. Those seismic accelerometers can measure from below 0.2 Hz to above 100 Hz with a noise floor of less than one micro-G and maximum input of 0.5 G. They were well suited to measurements over the entire frequency and amplitude ranges of interest. Because the transmissibility tests are direct, relative error in the final result is no worse than in the transducer calibrations themselves; subtractive cancellation error is not a factor. Data acquisition was done by a Zonic Model WCA Fourier Analyzer. Data was converted to MatLab format for display.

Test Procedure

The test procedure consisted of the following steps.

First, the airmount under test was configured with the desired combination of payload, accumulator tank, and active loop gain.

Second, pressure in the piston of the lower airmount, FIG. 29, was adjusted to float its load, namely its carriage, load plate, the upper airmount, its load plate, and the test payload.

Third, the displacement loop of the lower airmount was closed with a gain of 24.3 lbf/inch and its carriage was allowed to settle to the center of its vertical stroke.

Fourth, pressure in the piston of the upper airmount was likewise adjusted to float its load.

Fifth, a band-limited random signal was input to the power amplifier of the lower airmount. Bandwidth was nominally 0.1–70 Hz. Input amplitude was adjusted to just below that which would cause the carriage of the lower airmount to hit its travel stops.

Sixth, signals from accelerometers on the upper and lower load plates were connected to a Fourier analyzer and transmissibility was measured using the lower airmount carriage acceleration as the denominator. 800 spectral lines were measured over 0–50 Hz with 12–20 records per ensemble, Hanning window, and 50% overlap.

Seventh, data saved from each run included sample time histories (the last 2048-point block from each ensemble for each channel), spectra for each channel in units of G (rms) per spectral line, transmissibility, and ordinary coherence between the two channels.

Tests were run for a total of seven combinations of payload, accumulator tank size, and active displacement loop gain. The test matrix is shown in FIG. 30.

Results

Figure 31A:
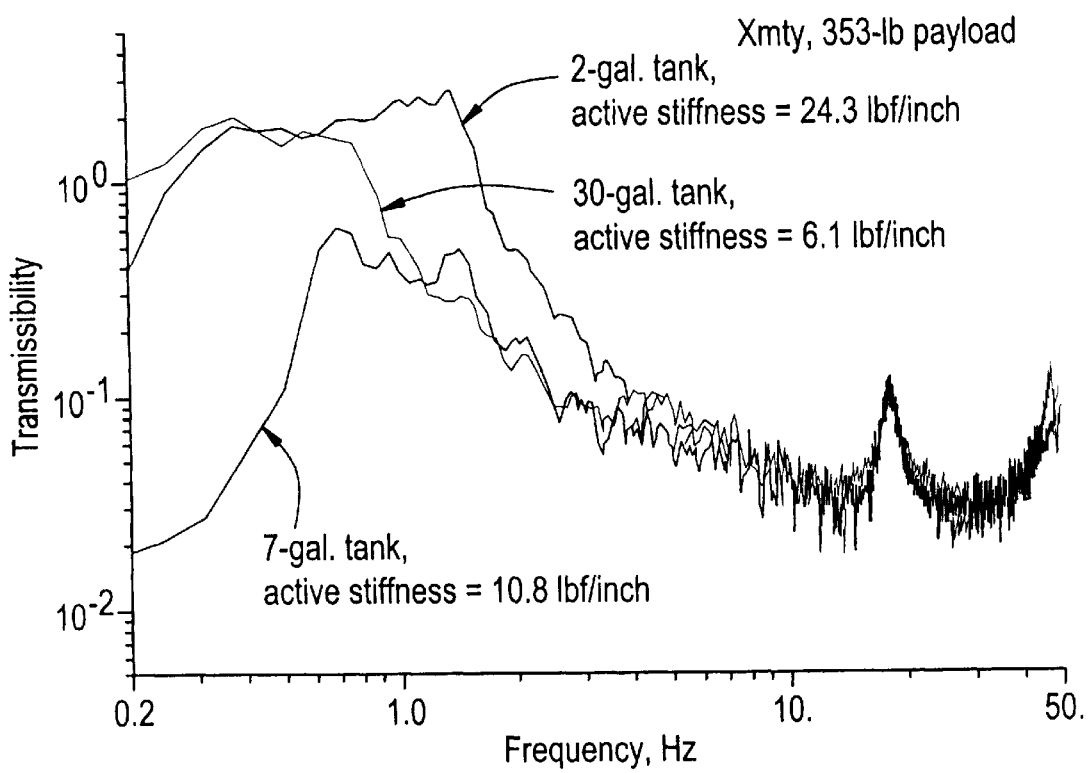
FIGS. 31A and 31B are graphs of transmissibility functions and coherence for a 353 pound payload with three different tank sizes.
Figure 31B:
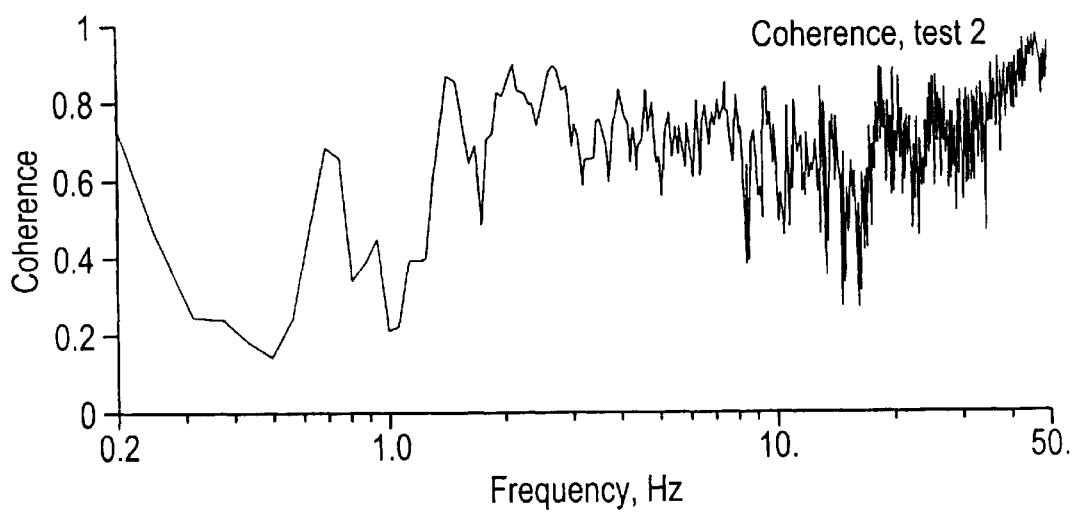

FIGS. 31A and 31B show transmissibility functions measured with a payload of 353 lbs (including load plate) and three different tank sizes. In each case, the active displacement-loop stiffness was set to approximately the value that would be used with that tank size. As the tank is made larger, a lower value of active stiffness is typically used to take advantage of the reduced pneumatic stiffness.

Several observations can be made regarding the measurements.

They are rather noisy. Coherence is low over the entire frequency range and is particularly poor below about 1.5 Hz.

Rolloff rate drops to only about 20–25 dB/decade by about 5 Hz.

An isolation floor of about −30 dB is present.

The cause of the disappointing results was traced to a slight friction drag in the air bearings. After some experimentation, it was determined that this was caused by the load plate. It tends to impose a bending moment on the crossmember of the device carriage to a greater degree than does the normal load interface. That deflects the bearing journal rails, shown in FIG. 5A, very slightly out of parallel and causes the radial load on the lower bearings to exceed the level that may be carried by the air film. That effect is probably present with the normal load interface but to a lesser extent: bearing friction occurs eventually as load is increased but the onset occurs at a higher load. Another preferred embodiment of the airmounts uses a modified carriage design with a smaller U-joint footprint and an added lower crossmember below the magnet body. Those changes largely eliminate the load-limit problem.

Payload was reduced to 195 lbs, a value below the friction threshold, and the tests were repeated. A low value of active centering stiffness was used for all tests to highlight the properties of the air spring. Results, shown in FIGS. 32A and 32B, were improved. The isolation floor is now about −40 dB and coherence is much better. The rolloff rate is essentially the same for all three tank sizes: −56 dB/decade.

Figure 32A:
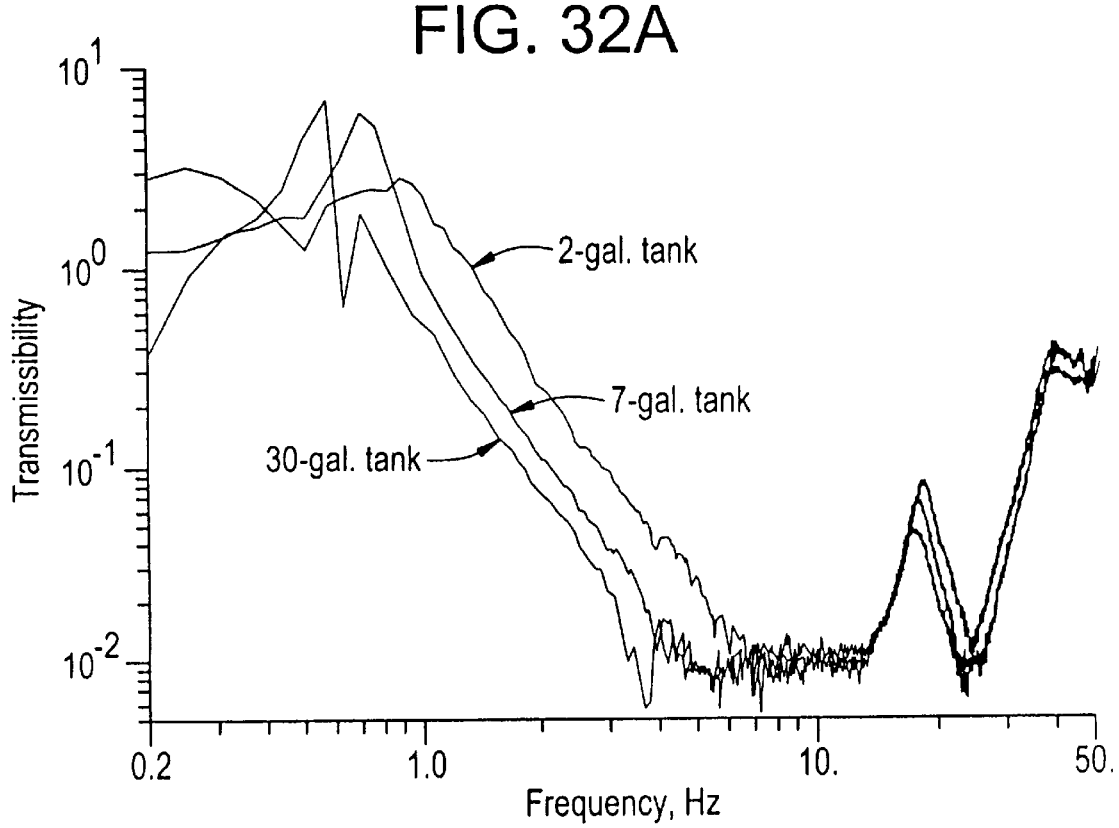
FIGS. 32A and 32B are graphs of transmissibility functions and coherence for a 195 pound payload with three different tank sizes.
Figure 32B:
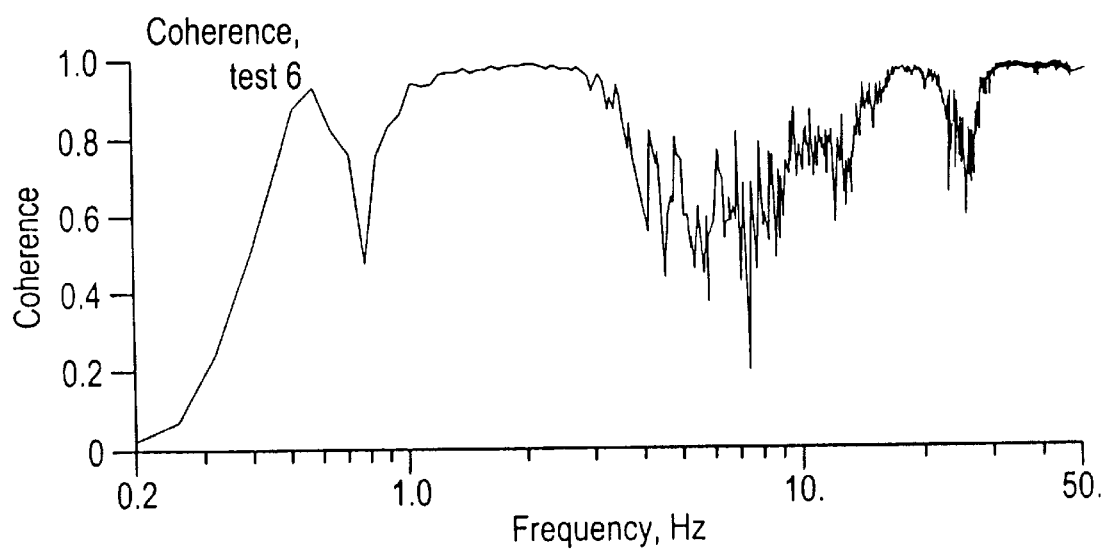

In all the tests shown in FIGS. 32A and 32B, the transmissibility increases above the −40 dB floor at higher frequencies, starting at about 14 Hz. Two facts suggest that this is an artifact of the test apparatus: (1) the behavior is almost independent of isolator stiffness (tank size), and (2) there is no physical reason why the stiffness of damping of the isolator should increase at higher frequencies. The rise is probably due to resonances of the test fixturing.

Figures 33, 34:
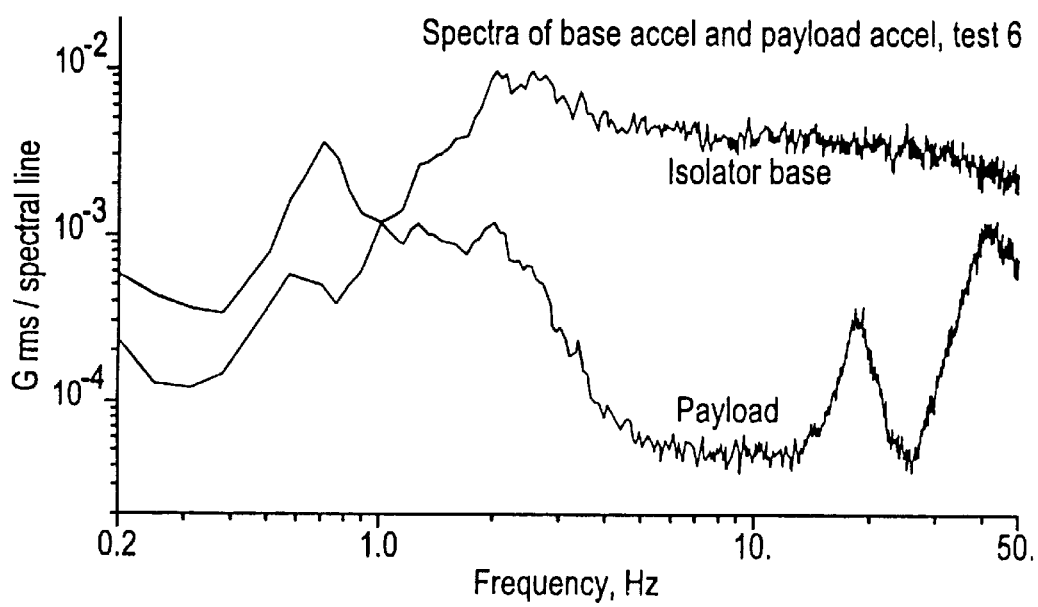
FIG. 33 is a graph of input and output acceleration spectra from component transmissibility tests for an isolator base and a payload.
FIG. 34 is a table comparing suspension frequencies from FIG. 32 with their calculated values.

Even when no friction is present, the input/output coherence across the isolator is poor for very low frequencies, below about 0.4 Hz. That is caused by the fact that the base acceleration spectrum drops off sharply for frequencies below about 1 Hz, as shown in FIG. 33. Each of the two functions in FIG. 33 is the square root of an acceleration power spectral density multiplied by the square root of the measurement frequency resolution. Ordinate units are thus g's (rms) per spectral line. The rolloff occurs because, at frequencies below the vertical resonance of the lower airmount (about 1 Hz), most of the force input to the coil is reacted by into the stiffness of the mount, rather than into the inertia of its payload. As often happens in frequency response measurements, the usable frequency range of the FRF is determined by limitations on the ability to control the spectrum of the denominator function.

FIG. 34 shows a comparison of suspension frequencies from FIGS. 32A and 32B with calculated values. The latter account for both the stiffness of the air spring, per FIG. 1, and the active displacement loop stiffness of 4.86 lbf/inch. Agreement is quite acceptable.

Test Conclusions

Overall the AS/VIS system performance was considered satisfactory. It demonstrated the feasibility of very soft passive pneumatic supports integrated with high-force, long-stroke voice coil actuators for active control.

Component-level test results demonstrated passive vertical isolation performance of −40 dB at frequencies as low as 4 Hz. Amplification at the suspension resonance as low as 9 dB was also demonstrated. That performance is well beyond the current state of the art for laboratory isolators of comparable payload and stroke, even before any active augmentation is used.

System-level performance results were consistent with those at the component level, although limitations in the test apparatus complicated their interpretation.

Control Laws

An objective of this invention was to produce a system that may be used for active vibration control.

A fundamental problem in airborne isolation is the presence of near-DC inertial forces imposed on the payload during aircraft maneuvering. The Airborne Laser 747 for example, will patrol in a figure-8 pattern, with long, constant-radius turns at either end. The effective G force on the payload is greater during the turns than during the straight sections of the figure-8. That may cause significant sag of a payload supported on the soft mounts, pneumatic or otherwise, needed for high isolation. Counteracting this effect is a natural application for the active subsystem of the AS/VIS.

Acceleration Feedforward

The control scheme for this purpose is filtered acceleration feedforward. DC-coupled accelerometers on the aircraft floor sense its acceleration, both rigid-body and flexible-body. Signals are lowpass filtered to eliminate flexible-body components and then used in an algorithm that calculates the required forces at the actuator degrees of freedom to make the payload DC acceleration match that of the airplane in all six degrees of freedom. Those force commands are then sent to the actuators. Negative displacement feedback is also used to make the active system behave like a set of six springs connecting the payload to the aircraft floor. That is necessary at least in the local vertical direction since the pneumatic isolators have no DC stiffness of their own.

A system of active springs with digital control has numerous advantages over passive. Among them is the fact that translational and rotational stiffnesses need not be interdependent. Roll stiffness may be introduced, for example, without affecting plunge stiffness and vice versa.

Acceleration feedforward reduces the stroke requirement of the isolators, an important consideration when the corner frequency must be low to achieve the required isolation. It does so at some sacrifice of isolation but that tradeoff may be optimized through the choice of type, order, and cutoff frequency of the lowpass filter.

Figure 35:
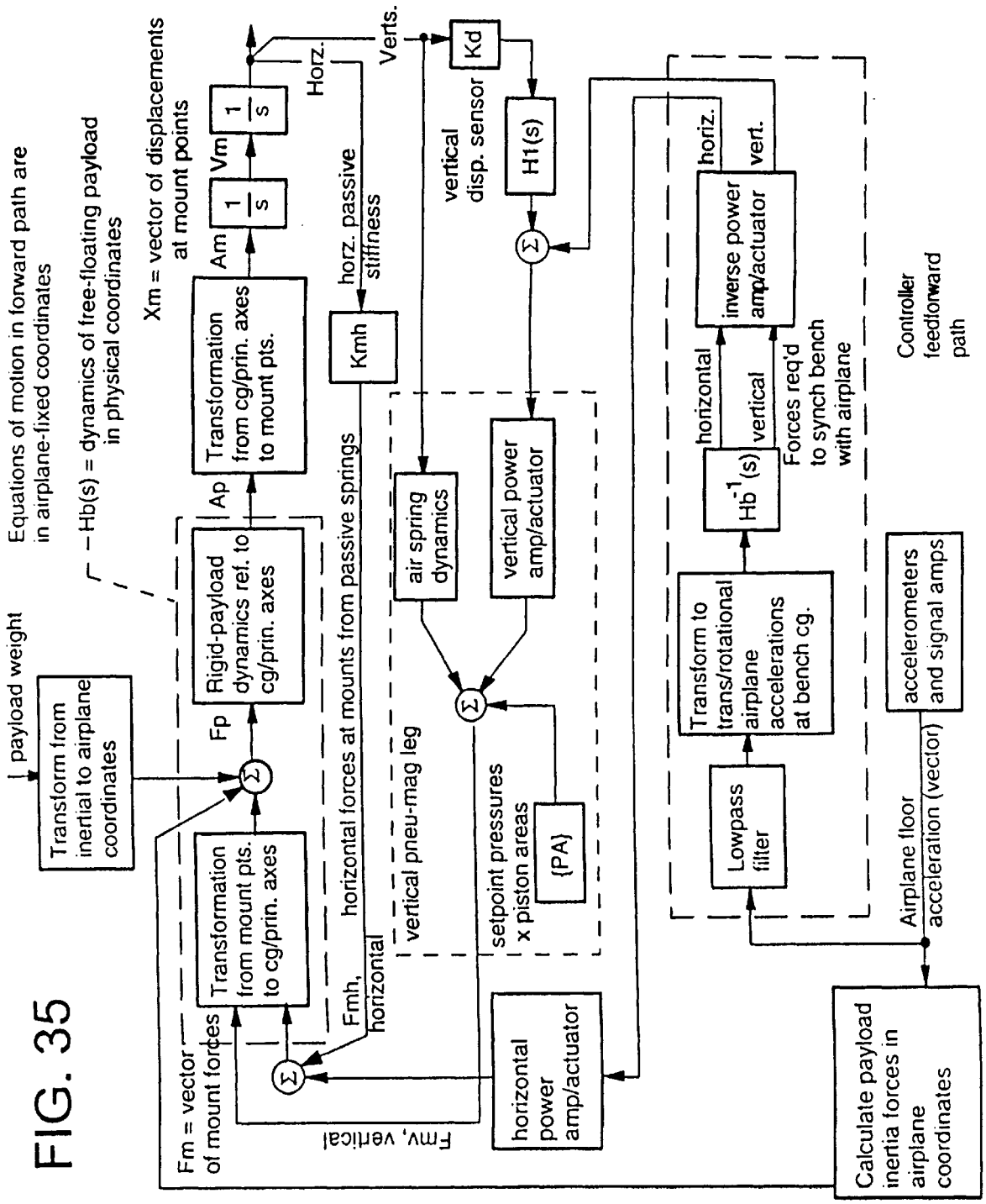
FIG. 35 is a block diagram of the 6-DOF control law.

The force and bandwidth capabilities of the actuators, combined with the low stiffness and zero friction of the air springs, allow a wide variety of control schemes to be implemented. FIG. 35 shows one such law. It is a block diagram for the full six degree-of-freedom system using acceleration feedforward. The heart of the representation is the block marked "Rigid-payload dynamics referenced to cg/principal axes." It represents the equations of motion for the payload floating free in space. That is, these are Euler's equations linearized for small rotations of the payload in either payload-fixed or airplane-fixed coordinates. Forces acting on the payload from the set of mounting struts are calculated in strut-fixed coordinates where only displacements and velocities along the strut axes are important. The resulting rotations and translations of the payload are then used to calculate translations of the payload-mount connection points in the directions of the strut axes. This latter transformation of displacements is represented by the box denoted "Transformation from c.g./principal axes to mount pts.".

The horizontal actuators and vertical airmount/actuators are represented separately in the block diagram, as are the vertical air spring and vertical magnetic actuator of the vertical unit. In this strategy, the horizontal actuators are used only for acceleration feedforward while the verticals are used for both this purpose and to produce centering stiffness via displacement feedback. This is necessary because the vertical air springs have no DC stiffness of their own. Both horizontal and vertical actuators could also be used to produce active damping if desired by using velocity feedback.

Figure 36A:
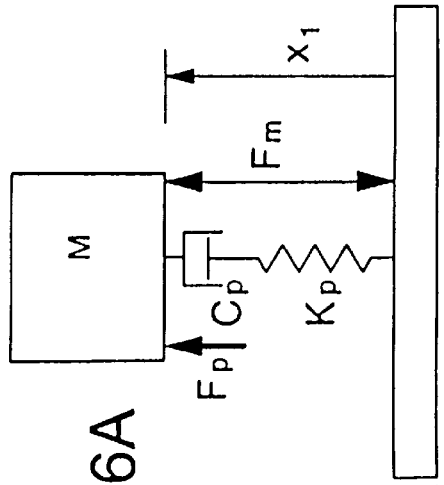
FIGS. 36A and 36B are a free-body diagram and a block diagram of a simplified control law for 1-DOF.
Figure 36B:
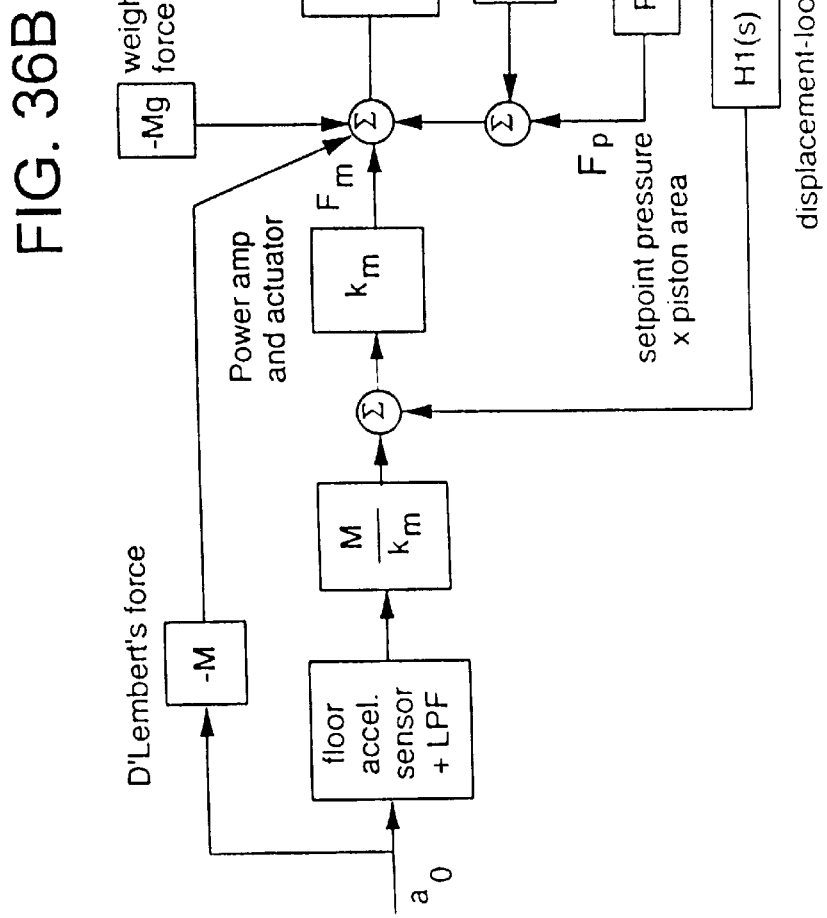

FIG. 36 shows a simplified, one degree of freedom version of the acceleration feedforward control strategy. It is easier to understand because no geometry transformations are involved but still captures the essential control feature. It was used to calculate sample performance results shown later.

As noted earlier, this is only one of many possible control strategies. The essence of the AS/VIS system is to support the payload with very low stiffness (thus minimizing unwanted forces due to mount-point motions) in parallel with high force/bandwidth actuators (to impose desired control forces). The exact control strategy is then determined by the system objectives. In the case of the airborne laser, this objective is usually to position and orient the payload accurately relative to some remote optical element inside the airplane, and to do so in the presence of both DC and AC disturbing accelerations at the mount points to the aircraft.

A linear spring-dashpot isolator with suspension frequency of 3.0 Hz, damping of 10% of critical, and no acceleration feedforward.

Figure 37A:
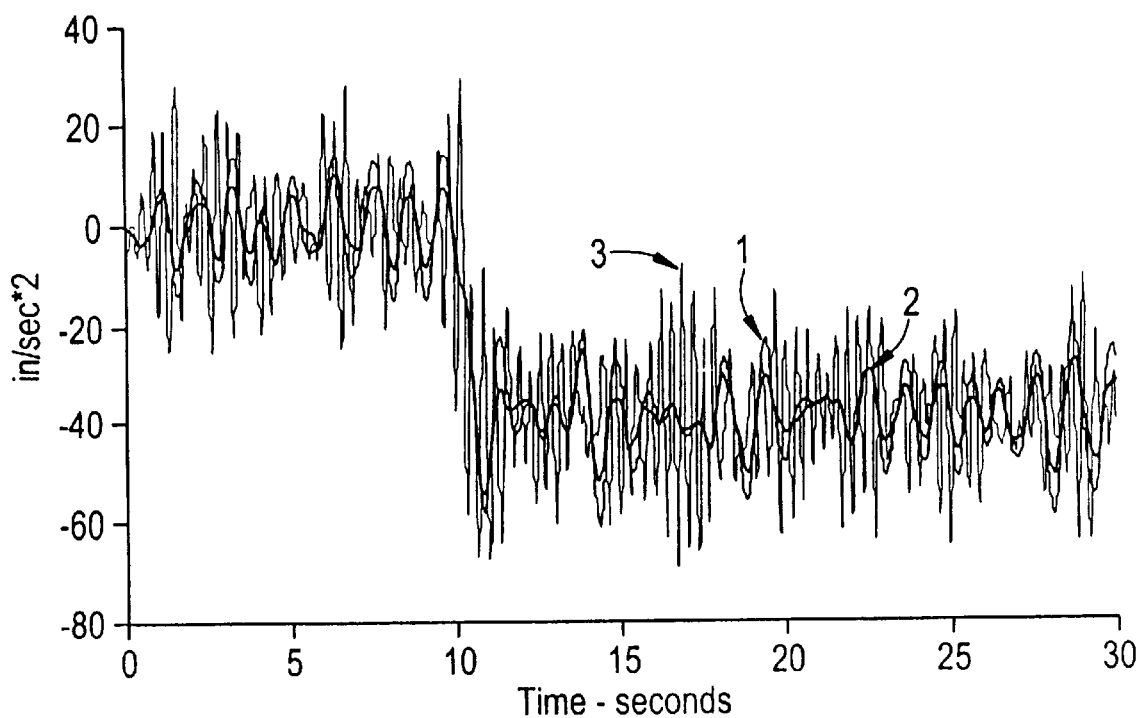
FIGS. 37A and 37B are graphs of payload absolute acceleration and isolator displacement for three types of isolators.
Figure 37B:
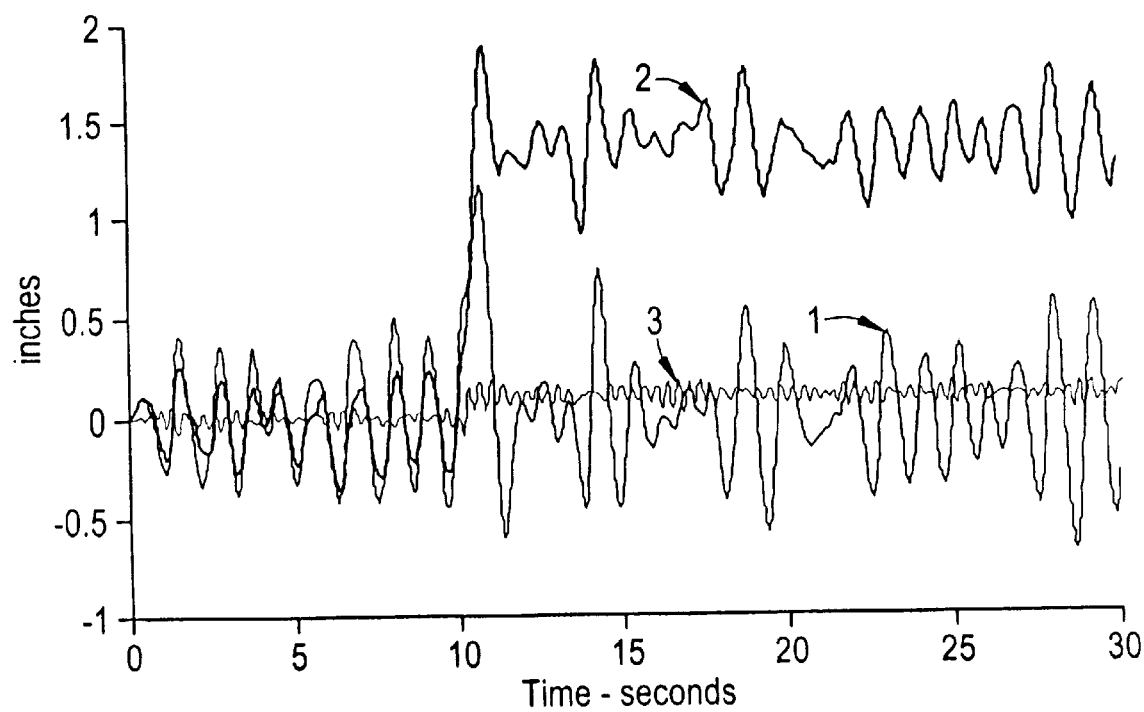

Results, shown in FIGS. 37A and 37B, show that the 1.07-Hz pneumatic isolator gives substantially better steady state isolation than the 3.0-Hz passive device but requires much larger stroke to accommodate an acceleration step transient. Adding feedforward reduces the stroke requirement at some cost in steady-state isolation. Besides illustrating the benefit of acceleration feedforward, the example shows why pneumatic mounts need it for use under varying quasistatic load. Referring to FIG. 1, an air spring adds dynamic stiffness, which tends to reduce isolation, but not static stiffness, which reduces displacement under static load. An AS/VIS airmount is, in effect, a 1.1 Hz device with respect to isolation but only a 0.66 Hz device with respect to displacement under step load.

Positive Position Feedback

A second function of the active subsystem is to add damping to horizontal suspension modes. That is necessary because the mechanism for allowing horizontal motion, the column flexures of the vertical mounts, is nearly undamped. The control law is positive position feedback (PPF). That involves feeding back position with a positive sign through a 2-pole resonant filter. The filter resonance is tuned to match the frequency of the suspension mode to be damped. The filter provides the 90-degree phase shift required for damping as well as amplification to make the effective damping quite large. Best of all, the filter causes the feedback gain to drop off at higher frequencies where the feedback would otherwise stiffen the system and reduce isolation. The tradeoff again is with respect to sag of the payload under transient step acceleration loads. It would be somewhat increased by PPF, which tends to destiffen the system at frequencies below the filter resonance.

Inertial Stabilization

A third control law is inertial stabilization. That amounts to using a payload-mounted, inertially referenced motion sensor as the feedback source. The actuators are driven in such a way as to attempt to null the output from this sensor. If the sensor produces a signal proportional to displacement, the control is essentially tying the payload to inertial ground through an active spring. If the sensor gives rate, such as a gyro, the tie to inertial ground is through an active dashpot. That approach would be appropriate in cases where the aircraft is flying straight and level and maximum isolation is required. It is similar to the method commonly used for stabilizing gimbal platforms.

The Airborne Suspension/Vibration Isolation System has been described. Aimed specifically at the requirements of the Airborne Laser, the system is a combination of an advanced pneumatic passive suspension, high-capacity voice-coil actuators, integrated sensors, a flexible, powerful control processor and a commercial system of software tools.

While the invention has been described with reference to specific embodiments, modifications and variations of the invention may be constructed without departing from the scope of the invention, which is defined in the following claims.

I claim:

1. A vibration isolation apparatus that supports a payload from a vibrating platform or floor comprising a passive isolator connected between the floor and payload, a set of actuators connected between the floor and payload, a set of displacement sensors connected between the floor and payload, and a controller connected electrically to the sensors and to the actuators such that the lowest frequency at which the system begins to provide isolation of the payload from the floor can be varied from as low as 0.1 Hz to over 3.0 Hz, wherein the passive isolator comprises plural pneumatic mounts connected to the platform and to the payload.

2. The apparatus of claim 1, wherein each pneumatic mount comprises a cylinder connected to the platform, an external tank, a line connecting the cylinder and the tank, a regulator for pressurizing the tank and the cylinder, and a piston within the payload connected to the payload.

3. The apparatus of claim 2, each pneumatic mount further comprising a universal joint between each piston and the payload for allowing pitch and roll between the piston and the payload.

4. The apparatus of claim 3, each pneumatic mount further comprising plural flexure columns connected between the cylinder and the platform for mounting the cylinder on the flexure columns.

5. The apparatus of claim 4, wherein the plural flexure columns have length and diameter dimensions chosen to give a predetermined horizontal stiffness.

6. The apparatus of claim 1, wherein each pneumatic mount comprises a baseplate assembly secured to the platform, a frame assembly secured vertically to the baseplate assembly, and a carriage assembly secured horizontally to the frame assembly.

7. The apparatus of claim 6, wherein the carriage assembly comprises a crossmember, plural tubular rails connected to the crossmember, a connecting rod connected to the crossmember, a piston connected to the connecting rod, and a u-joint assembly connected to the crossmember.

8. The apparatus of claim 7, wherein the u-joint assembly comprises plural upper trunnions for connecting to the payload.

9. The apparatus of claim 7, wherein the frame assembly comprises a cylinder for receiving the piston, a bearing plate connected to the cylinder, plural housing tubes connected to the bearing plate for receiving the plural tubular rails, and plural air journal bearings mounted inside each plural housing tube.

10. The apparatus of claim 9, wherein the frame assembly comprises a bottom iron, a center iron, plural top irons, plural outer irons, and plural magnet segments.

11. The apparatus of claim 10, further comprising plural cooling air jets within the center iron for cooling the vertical voice-coil actuator.

12. The apparatus of claim 9, wherein the plural housing tubes comprise four housing tubes.

13. The apparatus of claim 9, wherein the plural air journal bearings comprise two air journal bearings.

14. The apparatus of claim 9, wherein each vertical voice-coil actuator is positioned around a cylinder.

15. The apparatus of claim 7, wherein the plural tubular rails comprise four tubular rails.

16. The apparatus of claim 1, further comprising elastomeric bumpers for stopping motion of the payload.

17. A vibration isolation apparatus that supports a payload from a vibrating platform or floor comprising a passive isolator connected between the floor and payload, an active isolator having a set of actuators connected between the floor and payload, a set of displacement sensors connected between the floor and payload, and a controller connected electrically to the sensors and to the actuators such that the lowest frequency at which the system begins to provide isolation of the payload from the floor can be varied from as low as 0.1 Hz to over 3.0 Hz, wherein the active isolator comprises plural voice-coil actuators connected mechanically between the payload and platform and electrically to the controller, wherein the plural voice coil actuators comprise plural horizontal and plural vertical voice-coil actuators connected mechanically between the payload and platform and electrically to the controller.

18. The apparatus of claim 17, further comprising power amplifiers connected to the controller and to the plural horizontal and vertical voice-coil actuators for driving the plural horizontal and vertical voice-coil actuators in response to a signal received from the controller.

19. The apparatus of claim 18, further comprising plural platform accelerometers located on the platform for sensing accelerations of the platform and connected to the controller for controlling the horizontal and vertical voice coil actuators.

20. The apparatus of claim 19, wherein the plural platform accelerometers comprise at least six platform accelerometers.

21. The apparatus of claim 17, wherein each vertical voice-coil actuator has four sides.

22. The apparatus of claim 21, wherein the plural magnet segments comprise four magnet segments.

23. The apparatus of claim 22, wherein one magnet segment is positioned proximal each side of each vertical voice-coil actuator.

24. The apparatus of claim 17, wherein the plural vertical voice-coil actuators comprise four vertical voice-coil actuators.

25. The apparatus of claim 17, wherein the plural horizontal voice-coil actuators comprise four horizontal voice-coil actuators.

26. The apparatus of claim 17, wherein each horizontal voice-coil actuator comprises a trunnion base and an actuator carriage connected to the base.

27. The apparatus of claim 26, wherein the actuator carriage comprises a coil, plural magnet segments proximal the coil, plural journal rails, plural coil end frames for connecting the plural journal rails and the coil, plural air bearings for holding the plural journal rails, plural crossmembers for connecting the plural journal rails, and a pushrod for connecting a crossmember and the payload.

28. The apparatus of claim 27, further comprising ball joints at both ends of the pushrod for eliminating moments.

29. The apparatus of claim 28, further comprising plural axial flow fans for cooling the coil.

30. The apparatus of claim 27, further comprising a compressed air manifold for cooling the coil.

31. The apparatus of claim 27, further comprising plural heat sinks mounted to the coil for cooling the coil.

32. The apparatus of claim 17, wherein the displacement sensors comprise eight sensors, wherein four sensors are integrated in the horizontal voice-coil actuators and four sensors are integrated in the vertical voice-coil actuators.

33. A vibration isolation method for isolation of a payload from a vibrating floor, providing a passive isolation mount connecting the payload and floor, providing plural horizontal and vertical actuators producing force on the payload reacted against the floor, sensing relative displacement between the payload and floor, sensing absolute acceleration of the payload and the floor, and controlling motion of the payload by a controller that causes payload vibration to be attenuated to a level below that of the floor starting at a lower frequency that can be adjusted between 0.1 Hz and 3.0 Hz.

34. The method of claim 33, further comprising driving the active isolator by providing a power amplifier in response to a signal received from the controller.

35. The method of claim 33, further comprising sensing acceleration of the platform by providing plural platform accelerometers.

36. Stabilization and vibration isolation apparatus comprising a platform, flexure columns mounted on the platform, cylinders mounted on the flexure columns, external tanks connected to the cylinders, frictionless pistons mounted in the cylinders, flexure u-joints connected to the pistons, a payload connected to the flexure u-joints, coil actuators connected to the payload and a controller connected to the coil actuators for controlling the coil actuator.

37. The apparatus of claim 36, further comprising sensors connected to the platform and to the payload and connected to the controller for actively controlling the coil actuators for stabilizing and isolating the payload from vibrations of the platform.

38. The apparatus of claim 37, wherein the sensors comprise accelerometers connected to the platform, vertical displacement sensors connected between frame and carriage of the vertical mounts, horizontal displacement sensors connected between frame and carriage of horizontal actuators, and inertial sensors mounted on the payload and connected to the controller.

39. The apparatus of claim 37, wherein the sensors comprise vertical and horizontal platform-mounted accelerometers and vertical and horizontal payload-mounted accelerometers connected to the controller.

40. The apparatus of claim 36, wherein the coil actuators comprise square cross-section coils connected to the platform and square armatures connected to the payloads.

41. Stabilization and vibration isolation apparatus comprising an airmount actuator for mounting between a payload and a floor, the airmount actuator comprising a baseplate for fixing on the floor, flexure rods fixed on the baseplate, a frame mounted on the flexure rods, the frame further comprising an air cylinder and a bearing plate on the air cylinder, and bearing housing tubes connected to the bearing plate, air bearing journals mounted in the tubes, a carriage having a crossmember, rails connected to the crossmember and positioned in the air journal bearings, a flexure U-joint assembly mounted on the crossmember, an air piston in the air cylinder and connected to the flexure U-joint assembly and connectors on the U-joint assembly for connecting to the payload.

42. The apparatus of claim 41, wherein air pressure in the air cylinder lifts and supports the air piston, the carriage, the crossmember, the rails, the U-joint assembly, and the payload, wherein the U-joint assembly allows pitch and roll of the payload, wherein the journal bearings allow vertical motion of the rails, carriage and payload relative to the frame and the flexure rods allow horizontal movement of the frame, the carriage and the payload relative to the baseplate.

43. The apparatus of claim 42, further comprising plural airmounts connected between a payload and a floor, wherein the flexure rods allow yaw of the payload relative to the floor.

44. The apparatus of claim 41, wherein the air piston has internal air circuitry for releasing an air bearing film around the air piston and for providing frictionless axial movement in the air cylinder while under load and further comprising an air accumulator tank connected to the air piston and a regulator connected to the tank.

45. The apparatus of claim 41, further comprising a vertical actuator coil positioned around the air cylinder and connected to the carriage, and wherein the frame further comprises a magnet frame positioned near the coil.

46. The apparatus of claim 45, wherein the actuator coil comprises a voice coil that is substantially square and wherein the magnet frame comprises a bottom iron and a top iron and four magnet segments surrounding the voice coil and further comprising coil supports and coil feet connected to the coil and to the rails.

47. The apparatus of claim 46, wherein the magnet frame further comprises a back iron connected to the magnet segments and a center iron extending between the bottom iron and top iron and spaced internally from the voice coil, and air jets connected to the center iron and directed toward the voice coil for cooling the voice coil.

48. The apparatus of claim 47, further comprising flexure housing tubes connected to the bearing plate and surrounding the flexure rods, first bumpers connected to the coil feet for engaging ends of the bearing tubes, second bumpers connected to the carriage near the rails for engaging the bearing plate and third bumpers surrounding lower ends of the flexure rods for contacting lower ends of the flexure housing tubes, and a displacement transducer connected between the frame and the carriage for sensing vertical position of the carriage with respect to the frame.

49. The apparatus of claim 41, wherein the journal bearings comprise air bearings.

50. Stabilization and vibration isolator apparatus comprising a horizontal actuator, the horizontal actuator further comprising a magnet frame comprising a back iron, a front iron and magnet segments connected between the front iron and the back iron, an inner iron connected to the front and back irons and spaced from the magnet segments, a base connected to the magnet frame, bearing tubes connected to the frame, air bearings mounted in the bearing tubes, a carriage, carriage rails connected to the carriage and mounted in the air bearings, a coil mounted in a space between the inner iron and magnet segments and between the front and back irons, a coil support connected to the coil and to the rails, and a push member connected to the carriage for connecting the carriage to the payload.

* * * * *